(12) United States Patent
Ghandi et al.

(10) Patent No.: US 6,655,035 B2
(45) Date of Patent: Dec. 2, 2003

(54) PIEZOELECTRIC GENERATOR

(75) Inventors: Kamyar Ghandi, Arlington, MA (US); Nesbitt W. Hagood, IV, Wellesley, MA (US); Aaron A. Bent, Reading, MA (US)

(73) Assignee: Continuum Photonics, Inc., Billerica, MA (US)

( * ) Notice: Subject to any disclaimer, the term of this patent is extended or adjusted under 35 U.S.C. 154(b) by 0 days.

(21) Appl. No.: 09/986,205

(22) Filed: Oct. 19, 2001

(65) Prior Publication Data

US 2002/0121844 A1 Sep. 5, 2002

Related U.S. Application Data

(60) Provisional application No. 60/241,905, filed on Oct. 20, 2000, and provisional application No. 60/251,696, filed on Dec. 6, 2000.

(51) Int. Cl.⁷ .............................................. H01L 41/113
(52) U.S. Cl. ........................ 31/339; 310/311; 310/319
(58) Field of Search ................................ 310/311, 319, 310/339

(56) References Cited

U.S. PATENT DOCUMENTS

| 3,211,069 A | 10/1965 | Rixton ...................... 95/11.5 |
| 3,350,583 A | * 10/1967 | Schiavone ................. 310/319 |
| 3,396,311 A | 8/1968 | Maltner et al. .............. 317/81 |
| 3,558,903 A | 1/1971 | Yamano ..................... 310/339 |
| 3,666,976 A | 5/1972 | Gourlay et al. ............. 310/339 |
| 3,782,258 A | 1/1974 | Boekkooi et al. ........ 95/11.5 R |
| 3,819,963 A | 6/1974 | Kondo et al. ............... 310/339 |

(List continued on next page.)

FOREIGN PATENT DOCUMENTS

| CA | 2257935 | 12/1997 | ........... B05B/49/00 |
| EP | 0 673 102 A1 | 9/1995 | ............. H02J/7/00 |
| GB | 2 088 645 | * 6/1982 | ........... H02N/11/00 |
| WO | WO 97/04841 | 2/1997 | ........... A63C/5/075 |
| WO | WO 98/34689 | 8/1998 | ........... A63C/5/075 |
| WO | WO 99/23749 | 10/1998 | ............ H02N/2/18 |
| WO | WO 00/74224 | 12/2000 | ............ H02N/2/18 |

OTHER PUBLICATIONS

Search Report for International Application No. PCT/US01/45814 Mar. 2002.

Primary Examiner—Thomas M. Dougherty
(74) Attorney, Agent, or Firm—Fish & Richardson P.C.

(57) ABSTRACT

A method of extracting electrical energy from mechanical motion includes reusing an elastic portion of energy in a transducer by transferring the elastic portion of energy to another transducer. An apparatus for extracting electrical energy from mechanical motion includes at least two transducers coupled such that an elastic portion of energy in one transducer is transferable to the other transducer. The transducers are coupled by a member defining a waved surface, and each transducer defines a coupler in contact with the waved surface for movement following the waved surface. Couplers of two transducers are positioned such that they move out-of-phase relative to each other. The transducers are bound to a plate positioned between members such that the plate is deformed. The plate and members are configured such that relative rotation therebetween produces a wave that travels along the plate.

12 Claims, 39 Drawing Sheets

U.S. PATENT DOCUMENTS

| | | | |
|---|---|---|---|
| 4,091,302 A | 5/1978 | Yamashita | 310/339 |
| 4,156,825 A | 5/1979 | Kondo et al. | 310/339 |
| 4,181,492 A | 1/1980 | Zinke | 431/264 |
| 4,325,356 A | 4/1982 | Taschler | 126/413 |
| 4,387,318 A | 6/1983 | Kolm et al. | 310/330 |
| 4,417,170 A | 11/1983 | Benincasa | 310/345 |
| 4,442,372 A | 4/1984 | Roberts | 310/339 |
| 4,459,539 A | 7/1984 | Cordy, Jr. | 323/299 |
| 4,467,236 A | 8/1984 | Kolm et al. | 310/321 |
| 4,504,761 A | 3/1985 | Triplett | 310/800 |
| 4,510,935 A | 4/1985 | Spencer | 128/419 D |
| 4,523,261 A | 6/1985 | West | 362/192 |
| 4,536,700 A | 8/1985 | Bello et al. | 323/285 |
| 4,542,969 A | 9/1985 | Omura | 354/354 |
| 4,546,421 A | 10/1985 | Bello et al. | 363/21 |
| 4,595,856 A | 6/1986 | Glomb, Jr. | 310/339 |
| 4,629,970 A | 12/1986 | Johansson | 323/285 |
| 4,758,754 A | 7/1988 | Fink et al. | 310/78 |
| 4,845,338 A | 7/1989 | Lakic | 219/211 |
| 4,849,668 A | 7/1989 | Crawley et al. | 310/328 |
| 4,853,580 A | 8/1989 | Sula | 310/339 |
| 4,933,230 A | 6/1990 | Card et al. | 428/242 |
| 4,939,707 A | 7/1990 | Nagao | 368/64 |
| 5,034,648 A * | 7/1991 | Gastgeb | 310/319 |
| 5,208,506 A | 5/1993 | Yamashita | 310/328 |
| 5,245,242 A | 9/1993 | Hall | 310/316 |
| 5,305,507 A | 4/1994 | Dvorsky et al. | 29/25.35 |
| 5,404,067 A | 4/1995 | Stein et al. | 310/330 |
| 5,504,383 A * | 4/1996 | Facci et al. | 310/339 |
| 5,512,795 A | 4/1996 | Epstein et al. | 310/339 |
| 5,548,177 A | 8/1996 | Carroll | 310/339 |
| 5,552,656 A | 9/1996 | Taylor | 310/337 |
| 5,552,657 A | 9/1996 | Epstein et al. | 310/339 |
| 5,578,889 A | 11/1996 | Epstein | 310/339 |
| 5,621,264 A | 4/1997 | Epstein et al. | 310/339 |
| 5,656,882 A | 8/1997 | Lazarus et al. | 310/328 |
| 5,687,462 A | 11/1997 | Lazarus et al. | 29/25.35 |
| 5,703,474 A | 12/1997 | Smalser | 323/299 |
| 5,751,091 A | 5/1998 | Takahashi et al. | 310/339 |
| 5,775,715 A | 7/1998 | Vandergrift | 280/602 |
| 5,783,898 A | 7/1998 | Wu | 310/316 |
| 5,801,475 A | 9/1998 | Kimura | 310/319 |
| 5,814,921 A | 9/1998 | Carroll | 310/339 |
| 5,835,996 A | 11/1998 | Hashimoto et al. | 323/364 |
| 5,839,508 A | 11/1998 | Tubel et al. | 166/65.1 |
| 5,857,694 A | 1/1999 | Lazarus et al. | 280/602 |
| 5,977,690 A | 11/1999 | Ellis, II et al. | 310/330 |
| 6,080,817 A * | 6/2000 | Thieben et al. | 310/311 |
| 6,194,815 B1 * | 2/2001 | Carroll | 310/339 |
| 6,307,304 B1 * | 10/2001 | Yorio et al. | 310/339 |

* cited by examiner

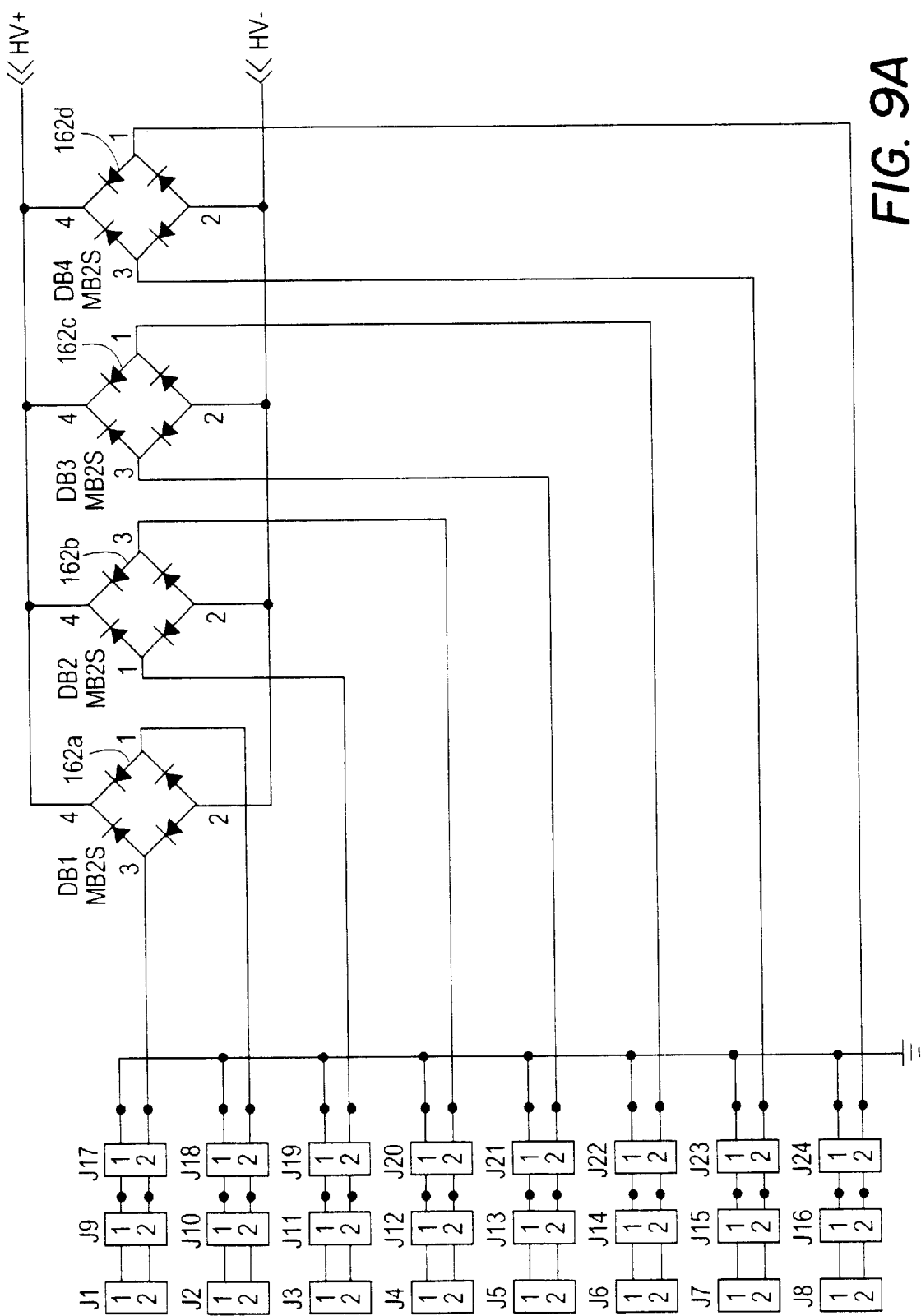

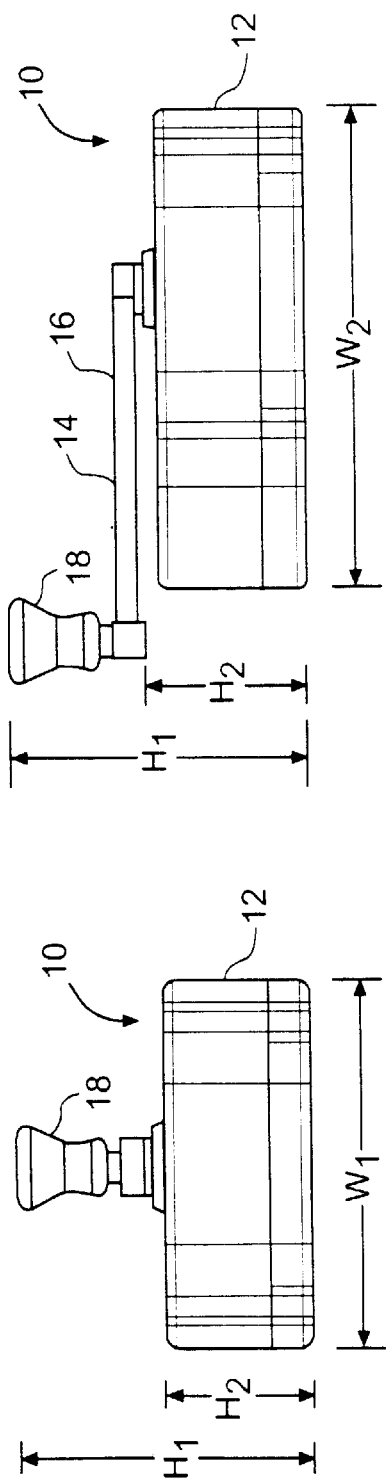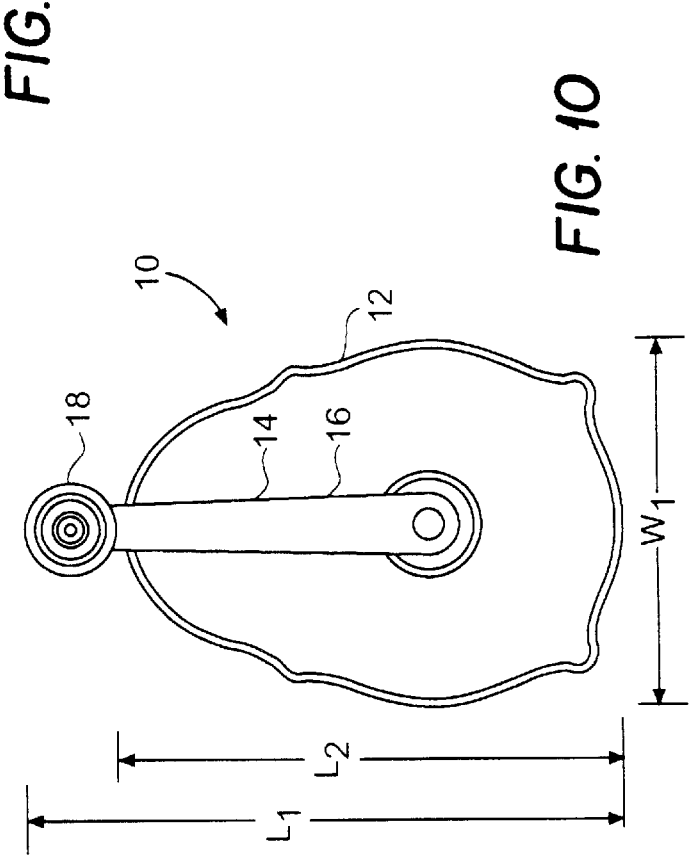
FIG. 10B
FIG. 10
FIG. 10A

PIEZOELECTRIC GENERATOR

This application claims priority from U.S. provisional application No. 60/241,905, filed Oct. 20, 2000, and U.S. provisional application No. 60/251,696 filed Dec. 6, 2000.

BACKGROUND

The invention relates to generators for portable devices, and more particularly to piezoelectric generators.

Transducers such as piezoelectrics, electrostrictors, and magnetostrictors, can be used to convert one form of energy to another. Energy from a mechanical input, for example, a periodic force applied to a device containing a piezoelectric or electrostrictive material, can be converted to electric energy. Therefore, such materials provide a means for harvesting electric power from a mechanical input.

The equations for such a piezoelectric element can be written as:

$$ky - Nv = F$$
$$Ny + Cv = Q$$

where y is the deformation of the transducer element, F is the force applied, v is the voltage across the electrodes of the transducer, Q is the charge produced, k is the equivalent stiffness of the transducer taking into account any mechanical amplification or geometric factors, N is the piezoelectric constant scaled by appropriate geometric factors, and C is the capacitance of the device.

SUMMARY

A generator employs piezoelectric elements to convert mechanical power to electrical power. The generator includes one or more piezoelectric transducers that are actuated by a mechanical input. The resulting electrical power is stored or used to run an electronic device. The generator is hand or foot operated.

According to one aspect of the invention, a method of extracting electrical energy from mechanical motion includes reusing an elastic portion of energy in a transducer by transferring the elastic portion of energy to another transducer.

According to another aspect of the invention, an apparatus for extracting electrical energy from mechanical motion includes at least two transducers coupled such that an elastic portion of energy in one transducer is transferable to the other transducer.

Embodiments of this aspect of the invention may include one or more of the following features.

The transducers are coupled by a member defining a waved surface, for example, a sinusoidal surface, and each transducer defines a coupler in contact with the waved surface for movement following the waved surface. The coupler contacts the waved surface on a first side of the coupler. The member defines a second waved surface, and the coupler contacts the second waved surface on a second side of the coupler opposite the first side. Couplers of two transducers are positioned such that they move out-of-phase relative to each other.

In a particular embodiment, the transducers are bound to a plate. The plate is positioned between members such that the plate is deformed. The plate and members are configured such that relative rotation therebetween produces a wave that travels along the plate.

DESCRIPTION OF DRAWINGS

Other objects, features and advantages of the invention will be apparent from the following description, taken together with the drawings, in which:

FIGS. 9 and 9A are circuit diagrams of the generator electronics;

FIGS. 10–10B are top and two side views, respectively, of the generator;

DETAILED DESCRIPTION

Figure 1:
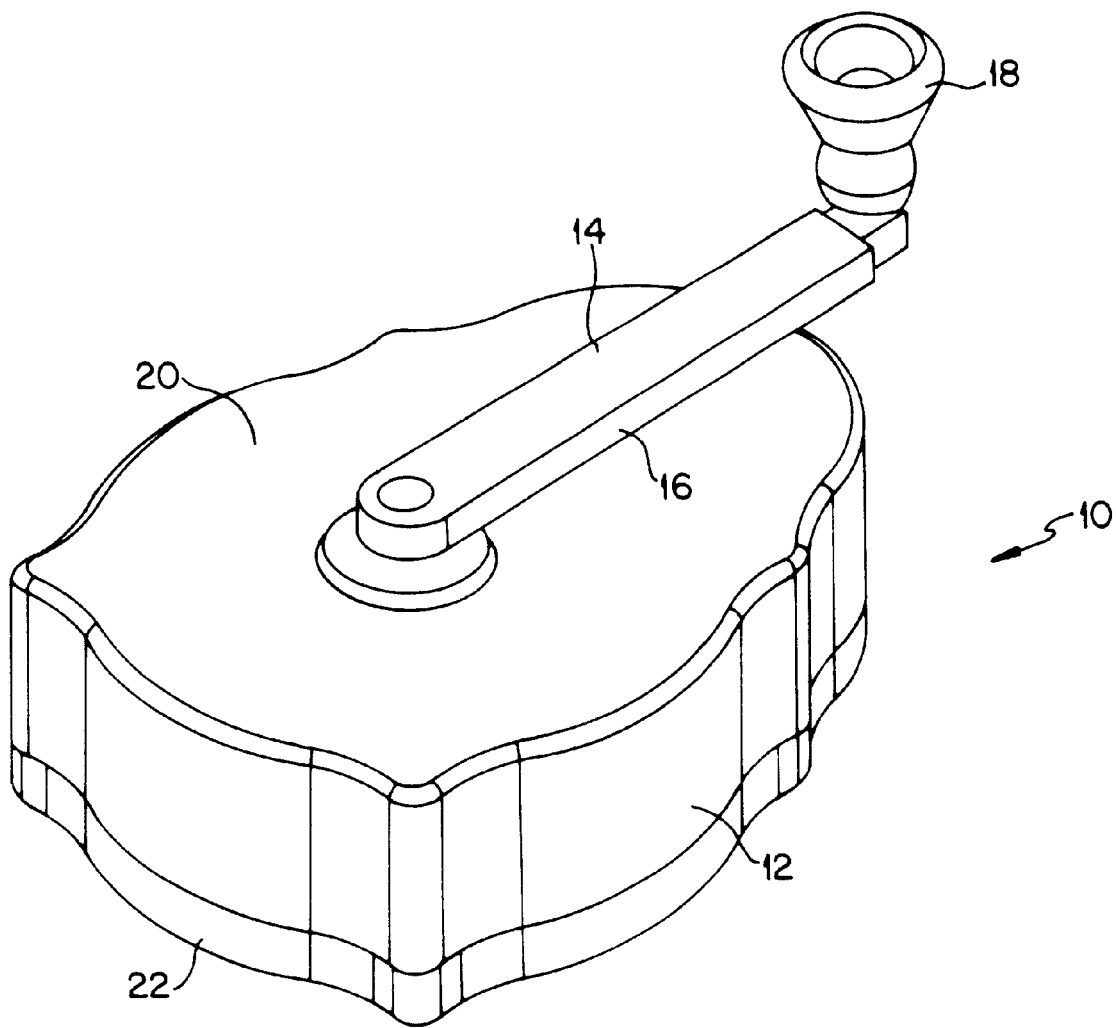
FIG. 1 is a perspective view of a piezoelectric generator according to the invention.
Figure 2:
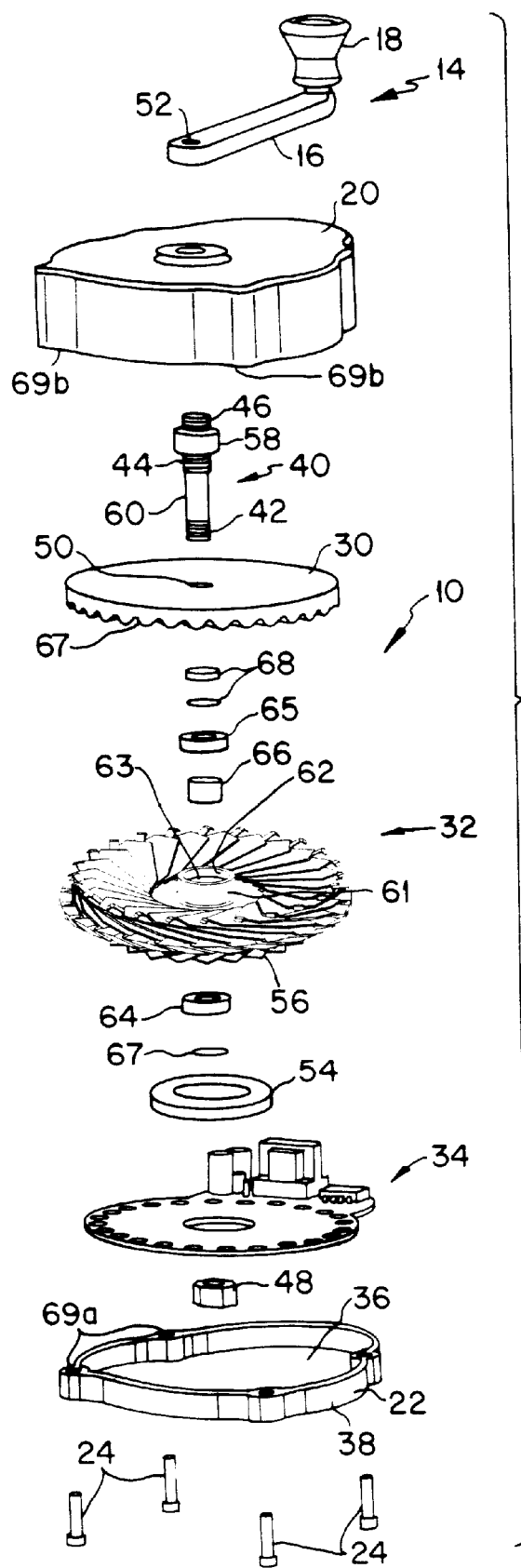
FIG. 2 is an exploded view of the generator.

Referring to FIG. 1, a handheld piezoelectric generator 10 employing piezoelectric elements for harvesting electric power from a mechanical input includes a housing 12 and a crank handle 14. Handle 14 is coupled to housing 12 for rotation relative thereto, and includes an arm 16 and a knob 18. Referring also to FIG. 2, housing 12 includes a case 20 and a case cover 22 attached to case 20 with screws 24. Located within housing 12 are a wave plate 30, a piezoelectric blade assembly 32, and a circuit board 34.

When assembled, circuit board 34 rests on a top surface 36 of case cover 22 and is restrained within a peripheral wall 38 of the case cover. Circuit board 34 and blade assembly 32 are separated by a spacer 54 that is glued onto bottom surface 56 of blade assembly 32. Handle 14 screws onto a shaft 40 that couples handle 14 and wave plate 30 such that rotating handle 14 causes wave plate 30 to rotate. Shaft 40 includes threaded regions 42, 44 and 46, an enlarged, unthreaded region 58 between threaded regions 44 and 46, and an unthreaded region 60 between threaded regions 42 and 44. Threaded region 44 is received within a threaded hole 50 in wave plate 30, and threaded region 46 passes through an unthreaded hole 53 in case 20 and is received within a threaded hole 52 in handle arm 16. Region 58 spans across hole 53 in case 20.

Blade assembly 32 includes a post 61 having an inner wall 62 defining a through bore 63. When assembled, region 60 of shaft 40 is located within through bore 63 with ball bearings 64, 65 between shaft 40 and inner wall 62 of post 61. Ball bearings 64, 65 are separated by a spacer 66. Threaded region 42 of shaft 40 is received within a nut 48, which holds shaft 40 in place. Between nut 48 and bearing 64 is a shim 67, and between bearing 65 and a lower surface 67 of wave plate 30 are shims 68. Case cover 22 defines four through holes 69a through which screws 24 pass, and case 20 defines four threaded holes 69b which receive screws 24.

Figure 3:
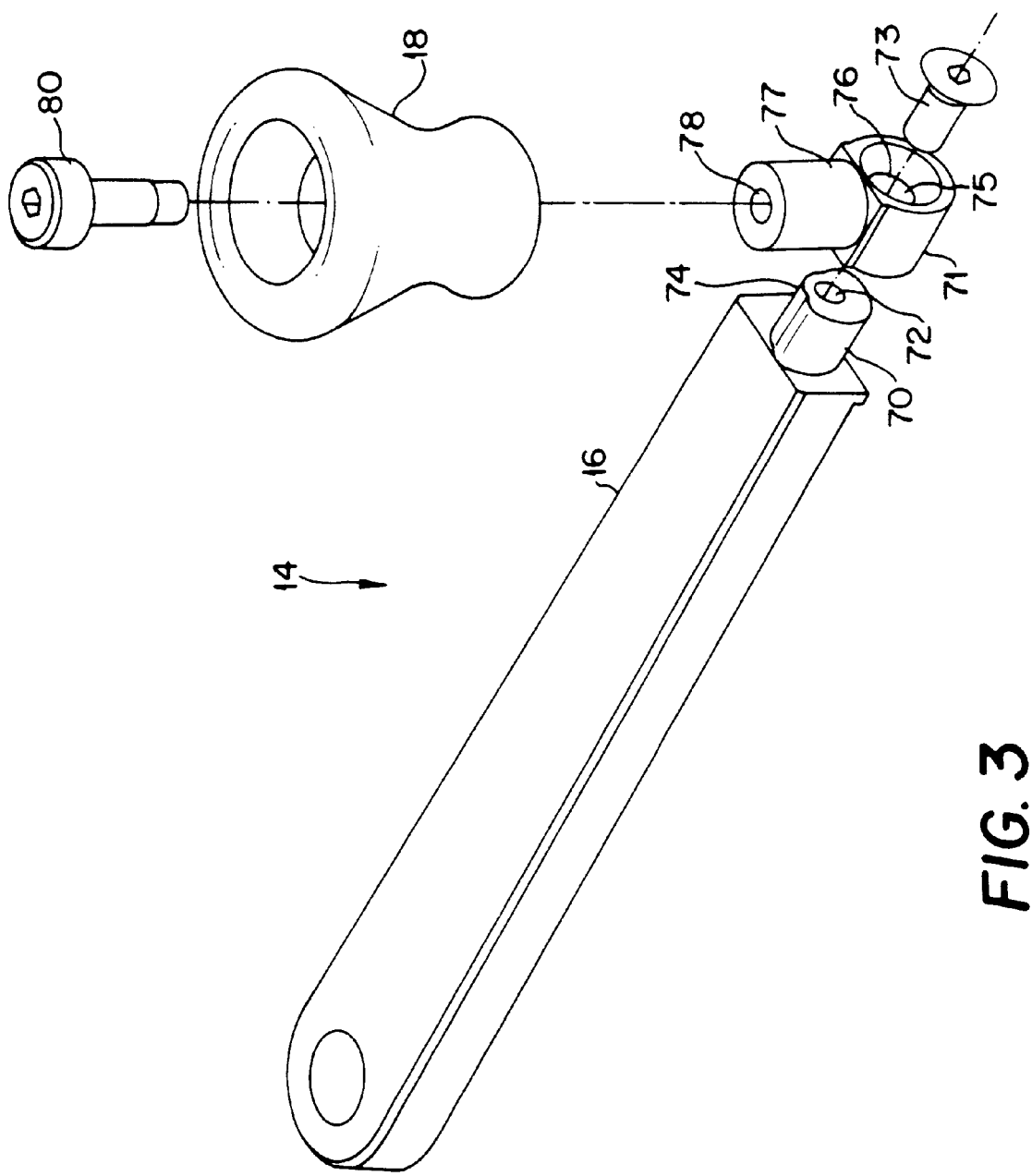
FIG. 3 is an exploded view of a crank handle of the generator.

Referring to FIG. 3, handle arm 16 includes a mount 70 over which an elbow member 71 is placed. Mount 70 defines a threaded hole 72 which receives a screw 73 for securing elbow member 71 to mount 70 while permitting elbow member 71 to rotate relative to mount 70. Mount 70 has a bulge 74 and elbow member 71 defines a through hole 75 with a ledge 76 that engages bulge 74 when handle 14 is turned clockwise. If one tries to turn handle 14 counterclockwise, elbow member 71 merely rotates about mount 70. This limits possible damage to blade assembly 32, which may occur if wave plate 30 is turned counterclockwise. Elbow member 71 includes a cylindrical extension 77 defining a threaded hole 78. Knob 18 is received over extension 77 and secured to extension 77 with a screw 80.

Figure 4:
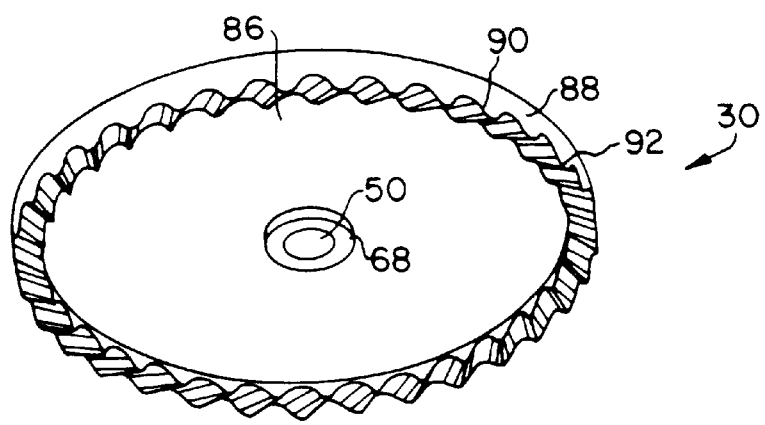
FIGS. 4–4B are perspective, side and bottom views, respectively, of a wave plate of the generator.
Figure 4A:
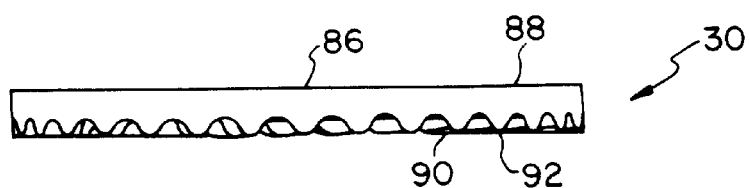
Figure 4B:
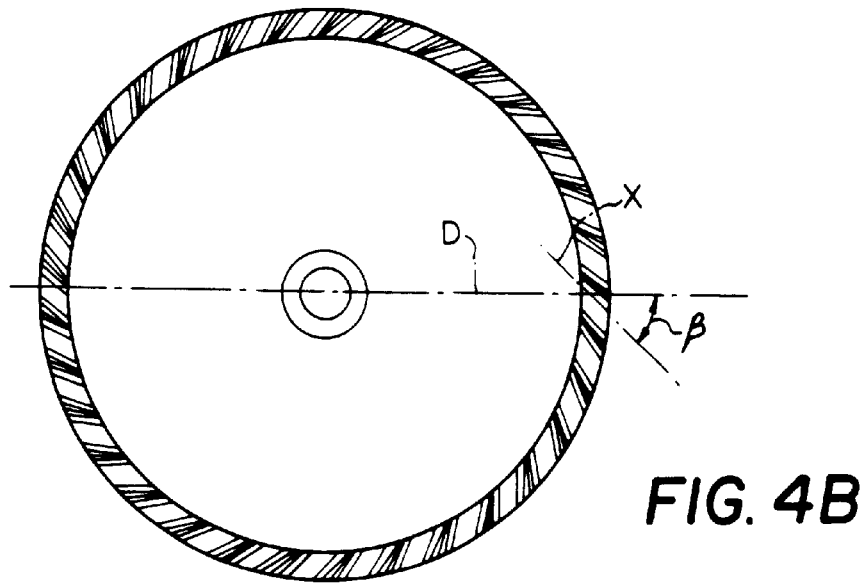

Referring to FIGS. 4–4B, wave plate 30 includes a base section 86 and a peripheral wall 88. Peripheral wall 88 has a face 90 formed with a sinusoidal wave pattern 92. Wave pattern 92 includes thirty-three waves peak-to-peak. The waves are offset relative to the wave plate diameter, i.e., the wave axis, X, is at an angle, β, of about 40° relative to plate diameter, D, such that the waves mate with blade tips 126.

Wave plate 30 is formed of aluminum with a Teflon impregnated hardcoat finish for low friction, thus increasing efficiency.

Figure 5:
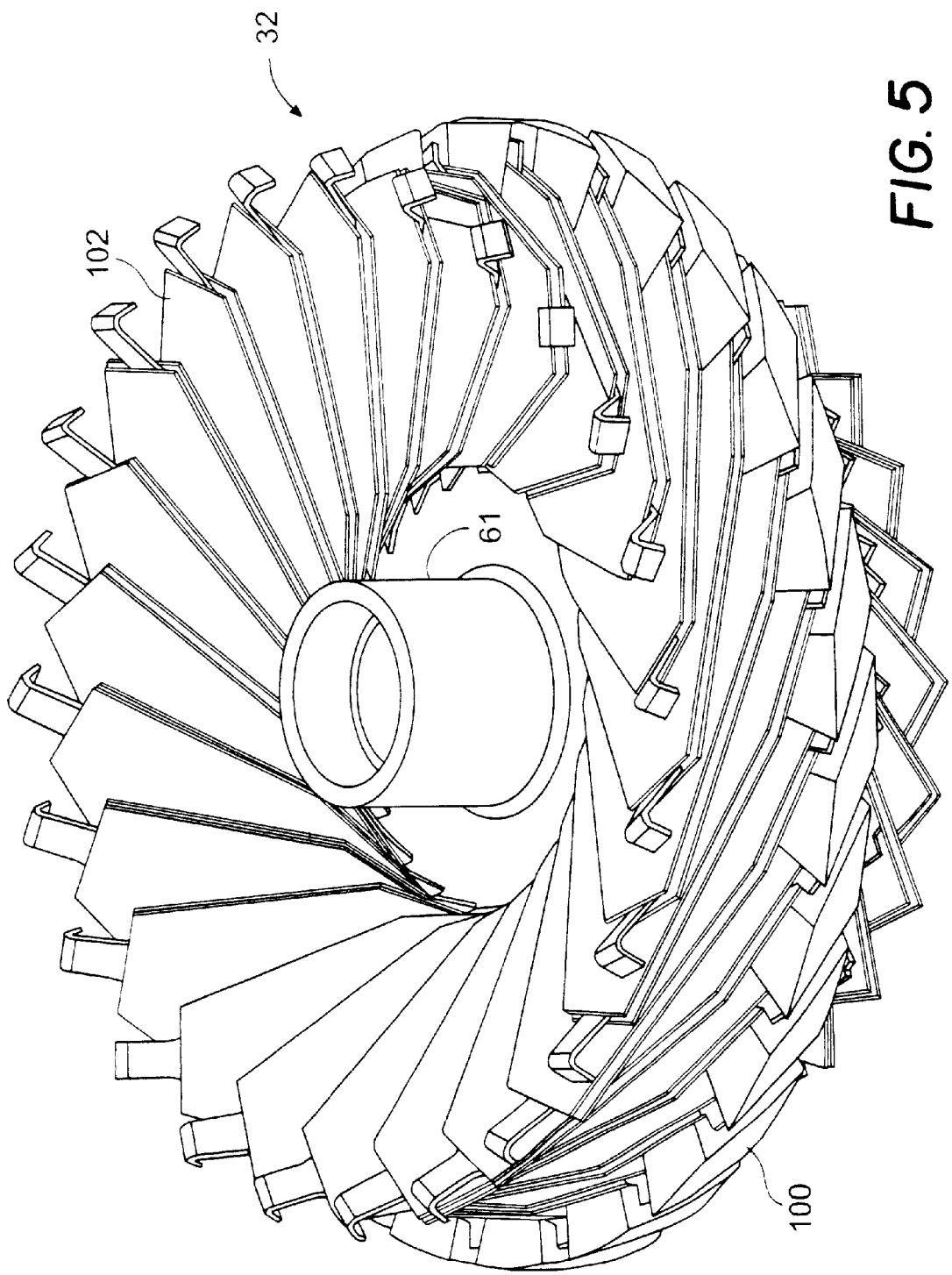
FIG. 5 is a perspective view of a blade assembly of the generator.
Figure 6:
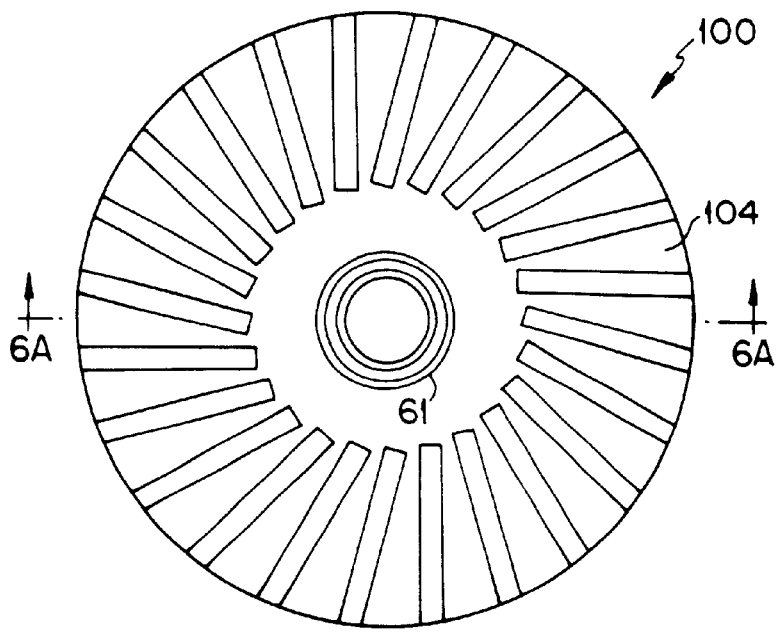
FIG. 6 is a top view of a mounting plate of the blade assembly of FIG. 5.
Figure 6B:
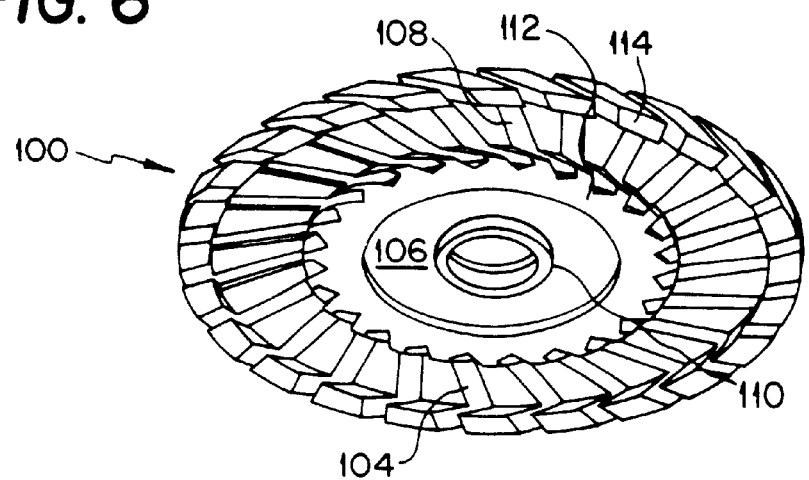
FIG. 6B is a bottom perspective view of the mounting plate of FIG. 6.
Figure 6A:
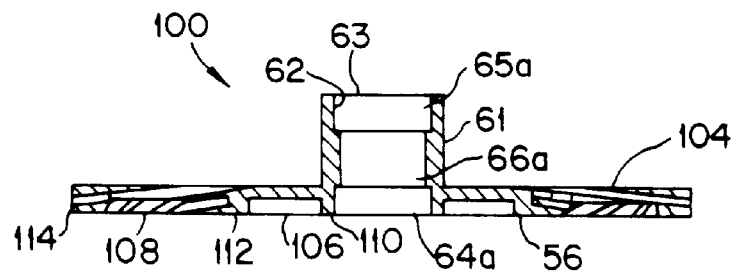
FIG. 6A is a cross-sectional side view of the mounting plate of FIG. 6, taken along lines 6A–6A.

Referring to FIG. 5, blade assembly 32 includes a mounting plate 100 and twenty-four equally, circumferentially spaced blades 102 attached to plate 100 and bendable relative to plate 100. Referring to FIGS. 6–6B, mounting plate 100 includes twenty-four angled slots 104, each for receiving a blade 102. Lower surface 56 of mounting plate 100 defines circumferential cut-outs 106, 108 to reduce the weight of the mounting plate. The cut-outs form circumferential lips 110, 112 and 114. Inner wall 62 of post 61 has a middle region 66a of a first diameter for receiving spacer 66, an outer regions 64a, 65a of larger diameter for receiving bearings 64, 65, respectively.

The thirty-three sine waves in pattern 92 and the twenty-four blades 102 define eight different phases of contact between pattern 92 and blades 102. At all times, three equally spaced blades 102, 120° apart, are at the same phase and thus contacting pattern 92 at the same point in an individual sine wave. This stabilizes wave plate 30 and blade assembly 32 by providing three points of even contact between the wave plate and blade assembly, and spaces the timing of maximum deflection of the blades. Having multiple phases has the effect of providing low ripple torque.

Figure 7A:
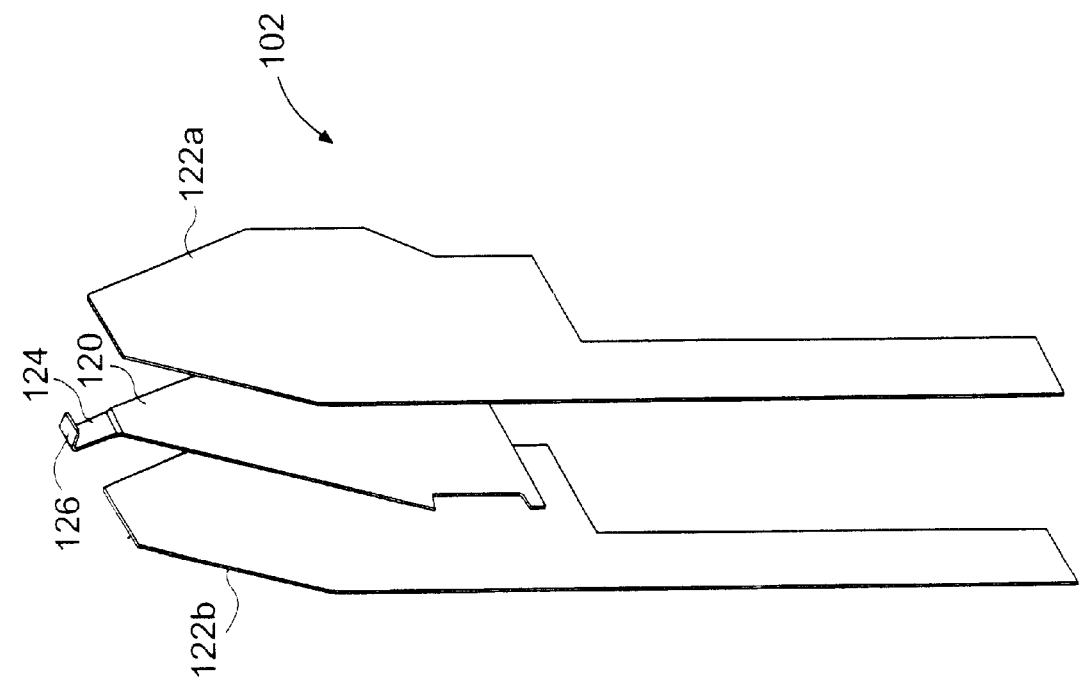
FIG. 7A is an exploded view of the blade of FIG. 7.
Figure 7:
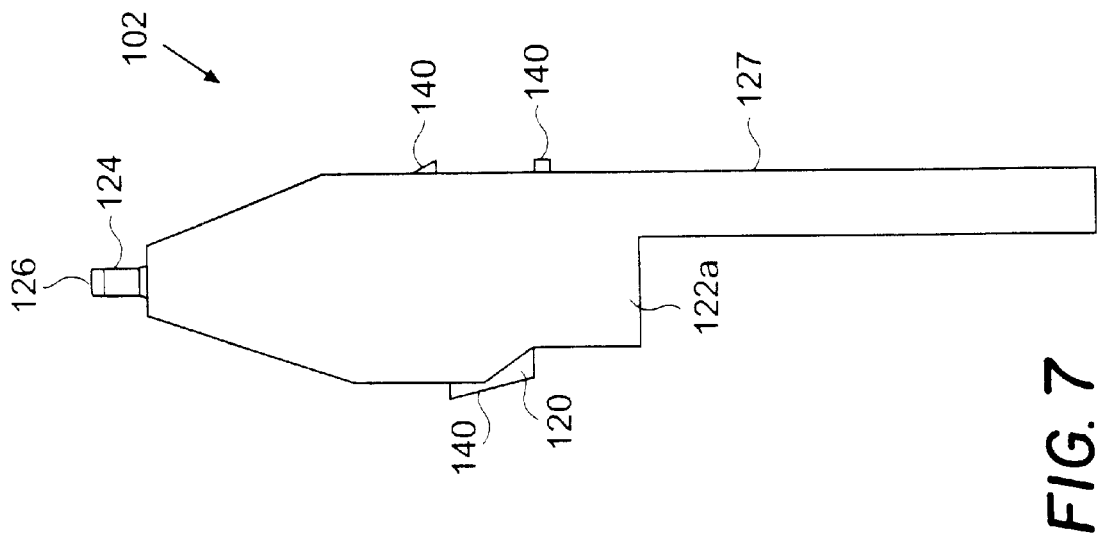
FIG. 7 shows a blade of the blade assembly of FIG. 5.
Figure 7B:
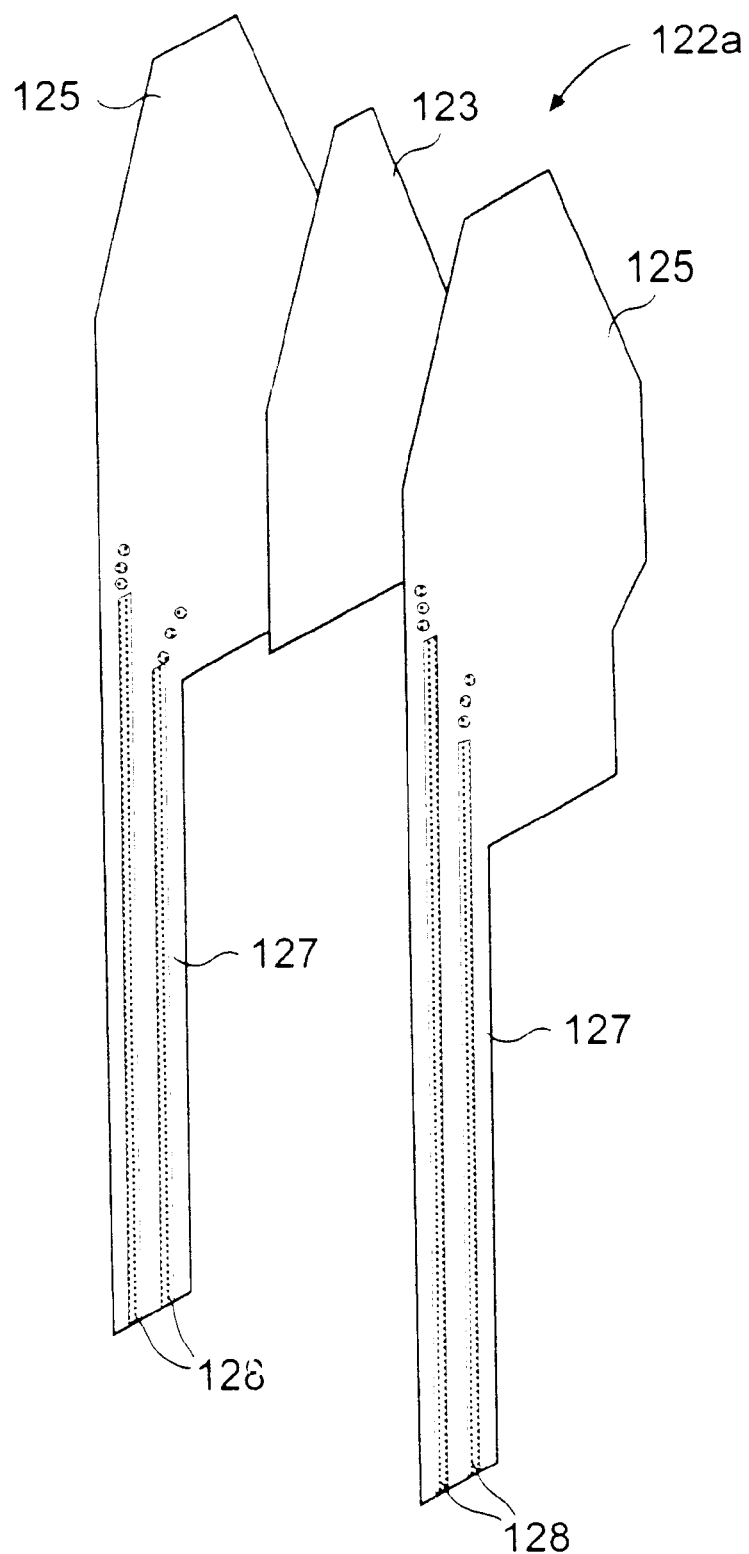
FIG. 7B is an exploded view of a piezoelectric layer of the blade of FIG. 7.
Figure 8:
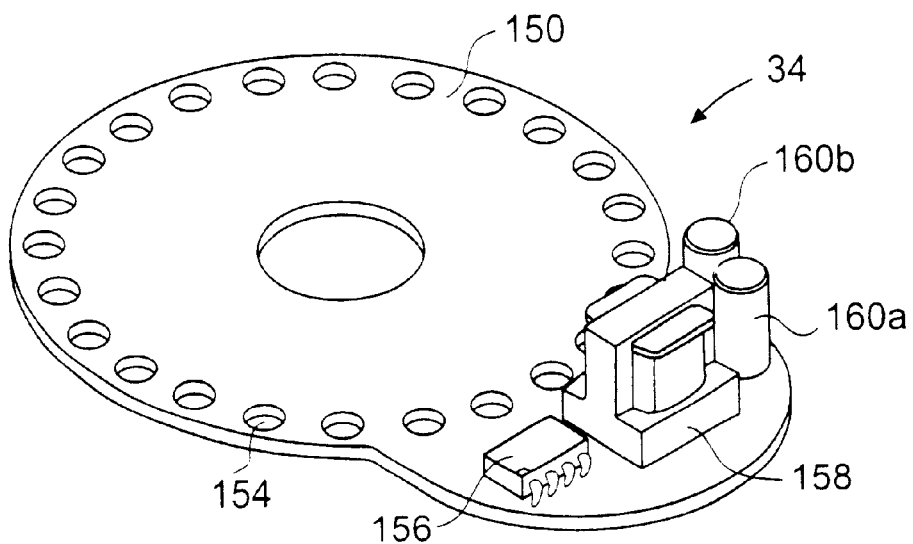
FIGS. 8 and 8A are top and bottom perspective views, respectively, of a circuit board of the generator.
Figure 8A:
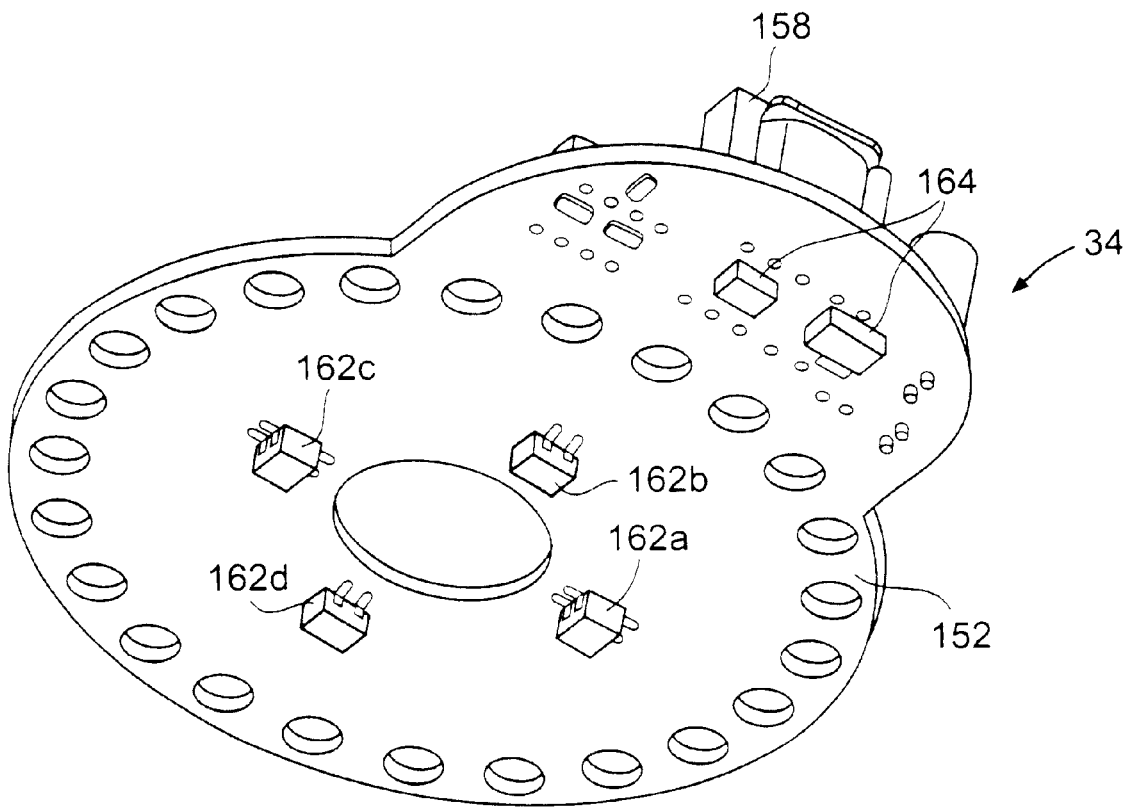
Figure 9:
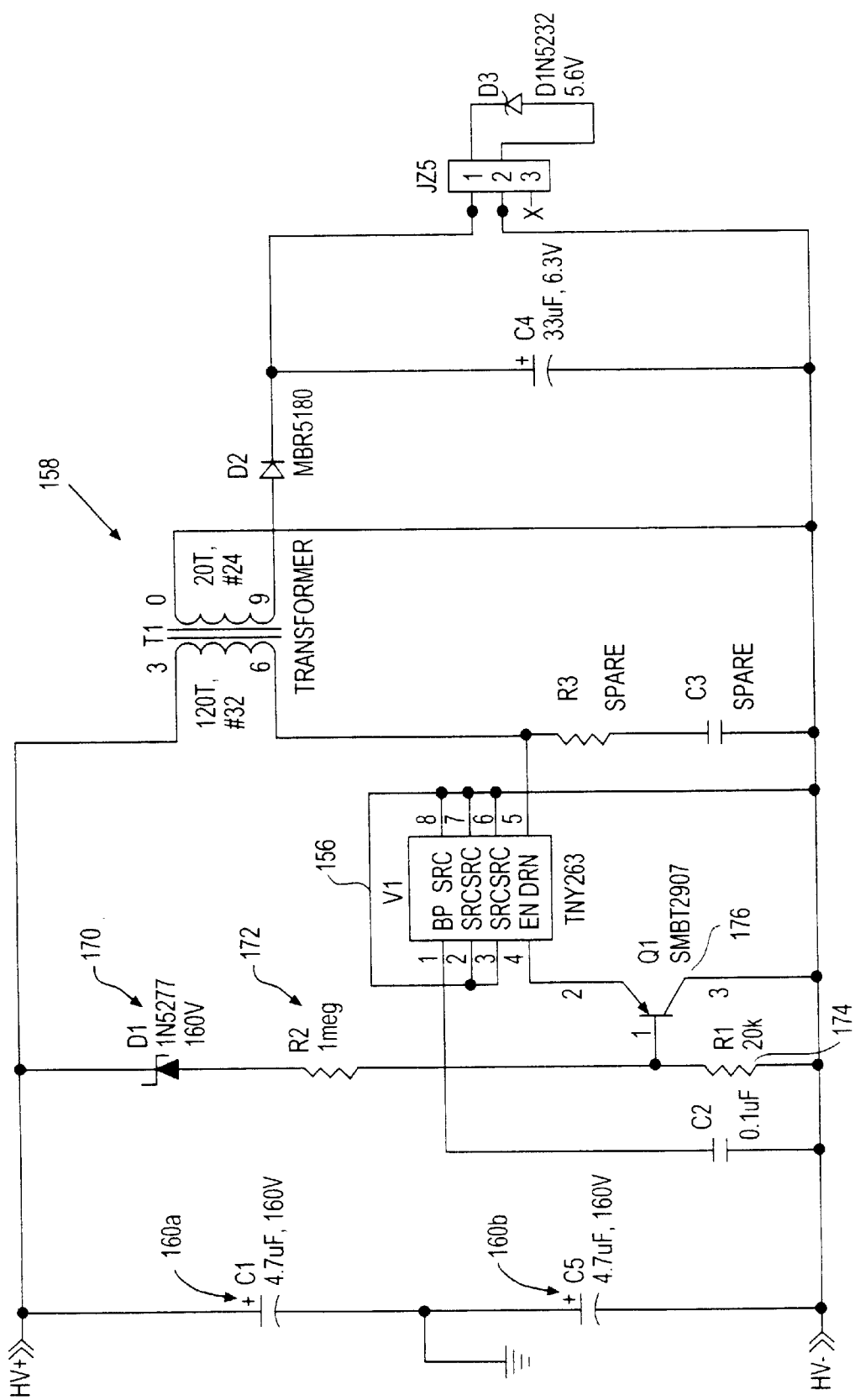

Referring to FIGS. 7–7B, each blade 102 includes a steel shim 120 sandwiched between two piezoelectric layers 122a, 122b. Each piezoelectric layer 122a, 122b includes a wafer or active fiber preform 123 between two uniform or interdigitated electrodes 125. Each electrode 125 includes a circuit connector 127 with electric leads 128 for making connection to a circuit, described below. Shim 120 includes a bent extension member 124 with an outer surface 126 that rides along face 90 of wave plate 30. Each blade 120 has a thickness of about 0.04 inches. Blades 102 are shaped and orientated on mounting plate 100 to pack tightly, and are triangular in shape to spread the stress evenly over substantially all of the piezoelectric material. The blade thickness and shape are designed to maximize electromechanical coupling between the tip deflection and electric output. Shim 120 includes tabs 140 which aid in positioning shims 120 on mounting plate 100.

Referring to FIGS. 8, 8A, 9 and 9A, circuit board 34 has a top surface 150, a bottom surface 152, and 24 holes 154 through which circuit connectors 127 extend. On top surface 150 are located a switching regulator 156, a transformer 158, and capacitors 160a, 160b. On bottom surface 152 are rectifier bridges 162a–d and capacitors and resistors 164.

Electric leads 128 of circuit connectors 127 are connected to rectifier bridges 162a–d with each of the three blades 102 undergoing deformation in phase jointly connected to a side of one of the rectifier bridges. Rectifier bridges 162a–d are connected to capacitors 160a, 160b. Capacitors and resistors 164 act as filtering components for switching regulator 156. Switching regulator 156 maintains the voltage across capacitors 160a, 160b at voltage which maximizes power transfer from piezoelectrics 123. For example, the peak-to-peak open circuit voltage of piezoelectrics 123 is 800 volts and capacitors 160a, 160b are maintained at about 200 volts.

The voltage level at which capacitors 160a, 160b are maintained is controlled by zener diode 170 and resistors 172, 174. For example, for a 160 volt zener diode 170, 1 meg resistor 172, and 20K resistor 174, when the voltage across capacitors 160a, 160b reaches about 200 volts, a transistor 176 is turned on, enabling switching regulator 156. As switching regulator 156 switches on and off, current flows from capacitors 160a, 160b through the primary of transformer 158. The secondary of transformer 158 outputs power at a low voltage (about 5 volts) for powering an external device. The circuit has a power conversion efficiency as high as about 80%.

Referring to FIGS. 10–10B, generator 10 is sized to fit in a users palm having an overall length, $L_1$, of about 4.5 inches, and overall width, $W_1$, of about 3 inches, and an overall height, $H_1$, of about 2 inches. Housing 12 has an overall length, $L_2$, of about 4.2 inches, and an overall height, $H_2$, of about 1 inch.

Generator 10 can be an independent device with a power cord that plugs into a device being powered, or generator 10 can be an integral component of the device being powered.

Other embodiments are within the scope of the invention.

For example, rather than turning handle 14, generator 10 can be actuated by a squeezing action or by pulling a string. Rather than a wave plate 30, generator 10 can include a jagged toothed plate which cause free vibration of blades 102. There can be a gear, cam, chain or belt drive between handle 14 and wave plate 30 such that wave plate 30 rotates, for example, four times for every turn of handle 14. The piezoelectric element can have any number of geometries, for example, a single wafer, a stack, or a bimorph. The device can incorporate mechanical levering or amplification systems.

When energy is supplied to blades 102 by a mechanical input, a fraction of the energy is stored as electric energy, while the remainder is stored as mechanical (i.e. elastic) energy. For example, if the transducer element represented by equation (1) is deformed, while the transducer is open circuit (Q=0), the voltage on the piezoelectric material is:

$$v = -Ny/C$$

Total Work done on the system is:

$$E_{in} = \frac{1}{2}ky^2 + \frac{1}{2}Cv^2$$

Total mechanical energy stored in the system is:

$$E_{mech} = \frac{1}{2}ky^2$$

Total electrical energy stored in the system is:

$$E_{elec} = \frac{1}{2}Cv^2$$

The square root of the ratio between the stored electrical energy, and the total work done on the system is known as the coupling coefficient (K) of the transducer element, and is a function of the material properties and geometry of the element:

$$K^2 = \frac{E_{elec}}{E_{in}} = \frac{N^2}{kC + N^2}$$

$E_{elec}$ represents the maximum amount of electric energy which can be harvested from the system in each cycle. The remainder of the work that was done on the system ($E_{mech}$) cannot be harvested electrically as it is stored in the elastic deformation of the transducer element. As the transducer is returned to its undeformed position, the mechanical energy is returned to the mechanical input. In many cases, however, the mechanical input cannot efficiently absorb the returned energy. Thus this energy is wasted. Based on this analysis, the maximum conversion efficiency of such a device is generally limited by the coupling coefficient squared. Depending on the type of transducer material and the geometry, this efficiency can range between 0.1–0.4.

Figure 11:
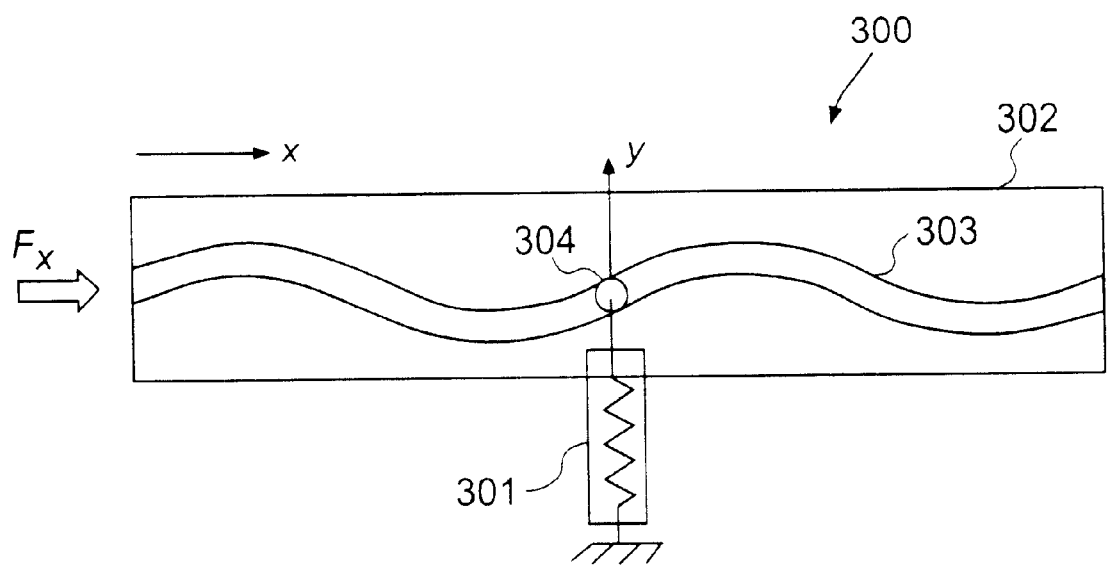
FIG. 11 is a side view of a transducer element coupled to a sinusoidal cam.

This fundamental limit on conversion efficiency can be circumventing by reusing the mechanical energy ($E_{mech}$) that would otherwise be wasted, for example, by transferring the energy to other transducer elements in the device. To explain this, referring to FIG. 11, we first consider a system 300 including one transducer element 301, conceptually represented as a spring, coupled to a cam 302 having a sinusoidal groove 303. As cam 302 is pushed in the x direction, transducer element 301 moves up and down in the y direction within groove 303. A bearing 304 can be used such that the friction between cam 302 and transducer element 301 is negligible. Under these conditions, the system can be described by the transducer equations (1) and the following cam equations:

$$y = A\sin(x/l)$$

$$F_x = F\frac{dy}{dx}$$

F is the force on transducer element 301 as calculated from equation (1), while $F_x$ is the force applied to cam 302 by the mechanical input.

Figure 12A:
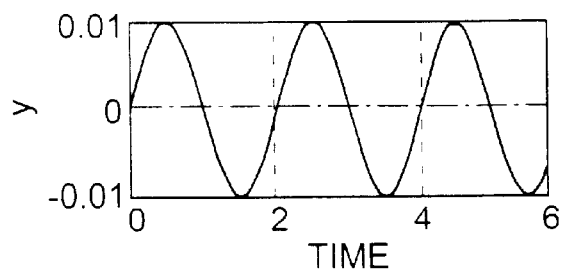
FIGS. 12a–12l show waveforms corresponding to the response of the system of FIG. 11.
Figure 12B:
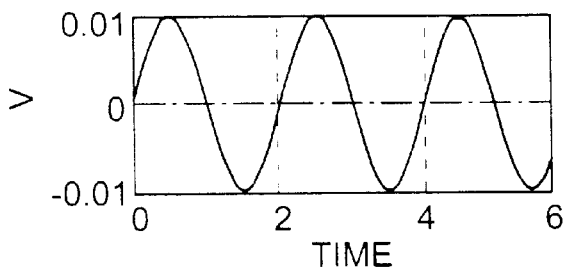
Figure 12C:
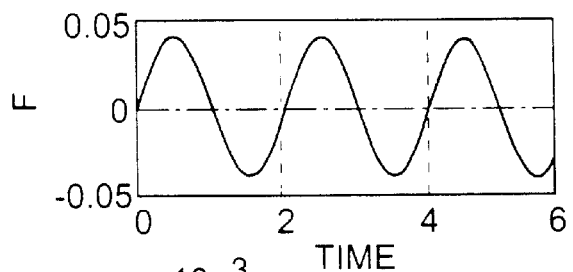
Figure 12D:
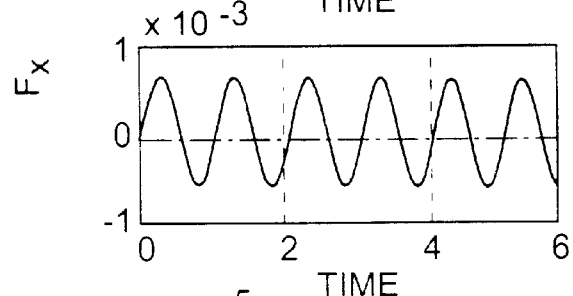
Figure 12E:
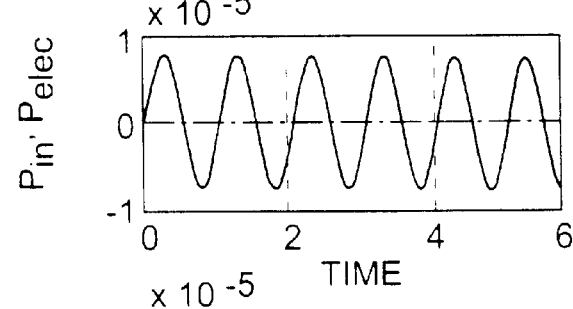
Figure 12F:
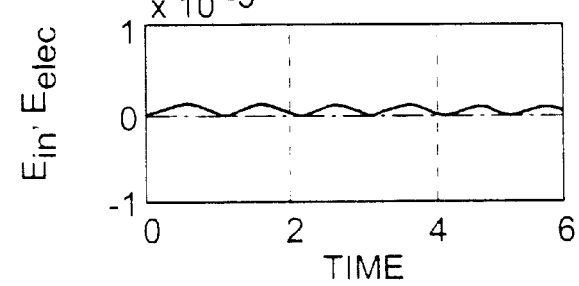
Figure 12G:
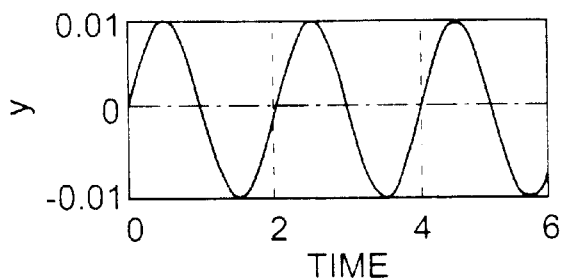
Figure 12H:
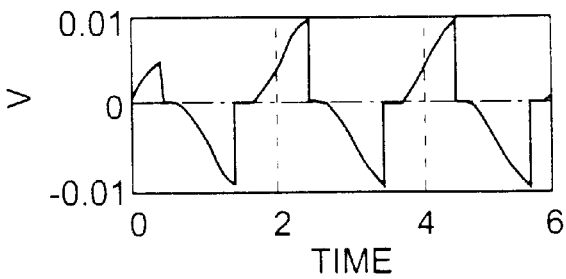
Figure 12I:
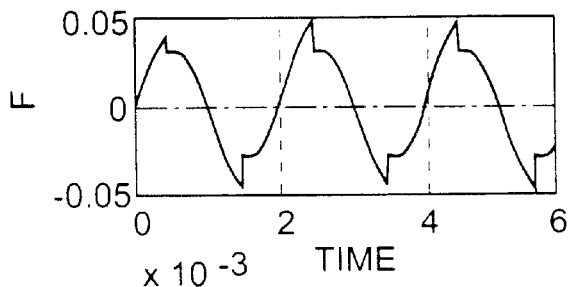
Figure 12J:
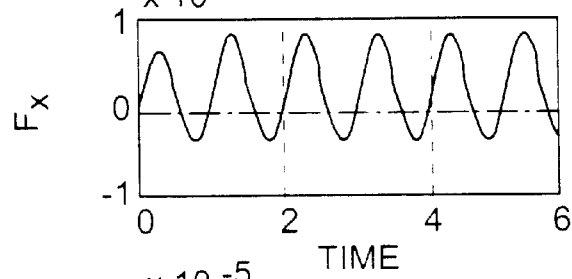
Figure 12K:
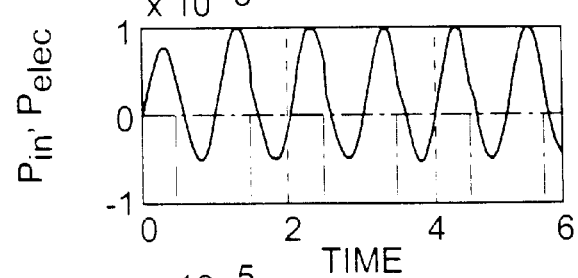
Figure 12L:
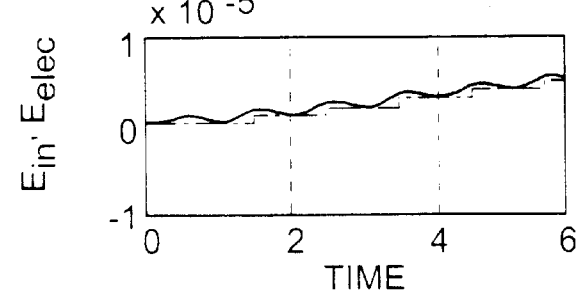

FIGS. 12a–12l show waveforms corresponding to the response of such a system. FIGS. 12a–12f show the response during open circuit operation. FIG. 12a shows the deformation of transducer element 301. FIG. 12b shows the voltage generated by transducer element 301. FIG. 12c shows the force applied to transducer element 301 by cam 302. FIG. 12d shows the force that is applied to cam 302 by the mechanical input. FIG. 12e shows the power input to the system by the mechanical input (solid line) as well as the electrical power extracted (dashed line). In the open circuit case, no electrical energy is extracted from transducer element 301. FIG. 12f shows the integral of the power in and power extracted.

FIGS. 12g–12l show corresponding waveforms obtained when transducer element 301 is connected to a harvesting circuit such as described in U.S. Ser. No. 09/584,881, entitled Electrical Power Extraction from Mechanical Disturbances, filed Jun. 1, 2000, hereby incorporated by reference herein in its entirety. For example, during each cycle, as the voltage of transducer element 301 reaches a maximum or a minimum, a switch (not shown) is turned on, and the electrical energy is extracted through an inductor (not shown). It can be seen from FIG. 12k that a significant fraction of the mechanical power that flows into the device flows back out during each cycle. The power flowing out would generally be wasted and is the main reason for the low conversion efficiency.

Figure 13:
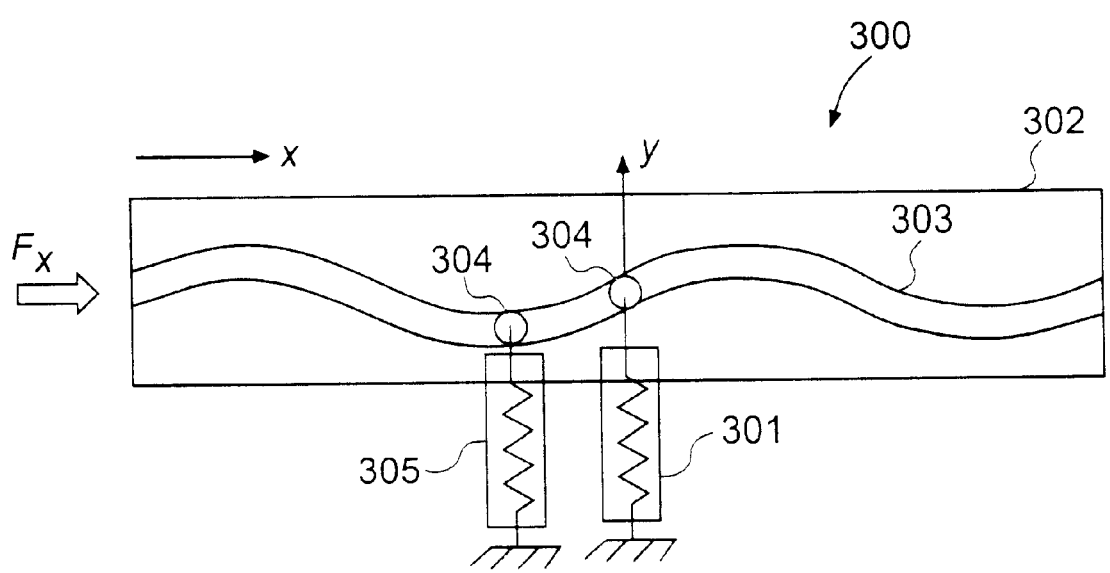
FIG. 13 is a side view of two transducer elements coupled to the sinusoidal cam of FIG. 11.

Referring to FIG. 13, to reuse the energy a second transducer element 305 coupled to cam 302 is used. By positioning the two elements such that they are 90 degrees out of phase with respect to each other, energy being returned by one element is transferred to the other through the cam and vice versa. As shown in FIG. 13, transducer element 301 is in an unstressed condition and transducer element 305 is stressed. As cam 302 moves in the direction of arrow, X, the stress on transducer element 305 decreases, and the stress on transducer element 301 increases. Thus, energy being returned by transducer element 305 is transferred to transducer element 301 through cam 302.

This can be seen in the waveforms shown in FIG. 14. FIGS. 14a–14f show the response during open circuit operation. The key feature is that because the two transducer elements 301, 305 are 90 degrees out of phase, the net force on the cam is zero. Thus, during open circuit operation (and in the absence of frictional losses), no energy is required to move the cam. As the cam moves, the energy required to move one transducer element is balanced by the mechanical energy being returned by the other transducer element.

Figure 14A:
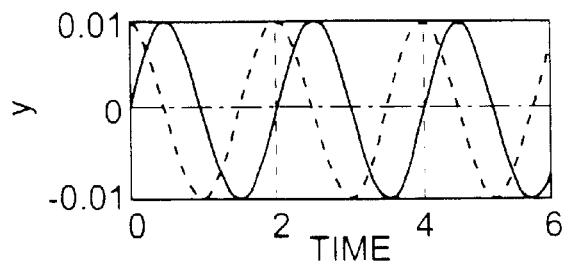
FIGS. 14a–14l show waveforms corresponding to the response of the system of FIG. 13.
Figure 14B:
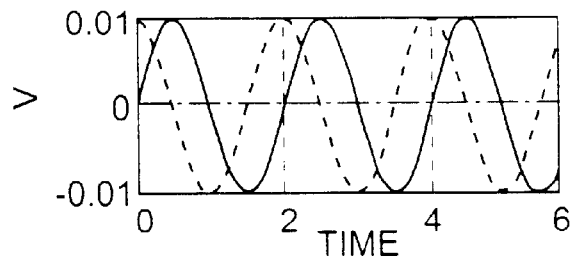
Figure 14C:
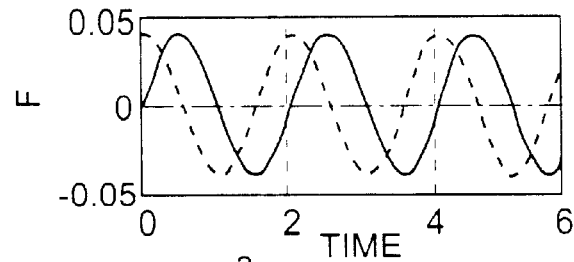
Figure 14D:
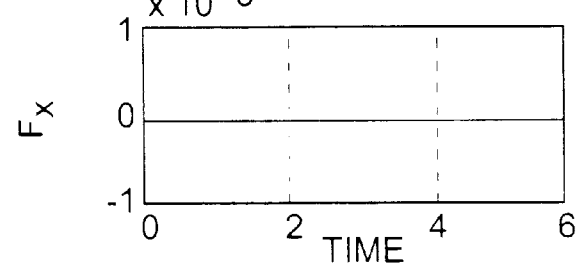
Figure 14E:
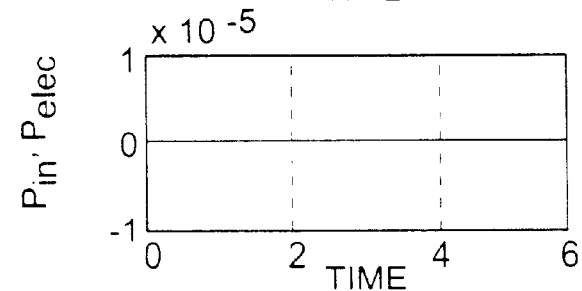
Figure 14F:
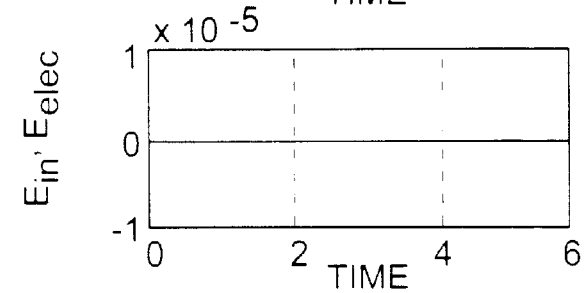
Figure 14G:
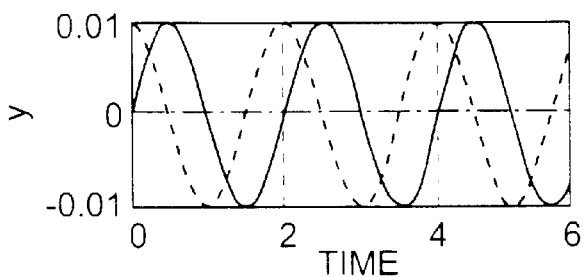
Figure 14H:
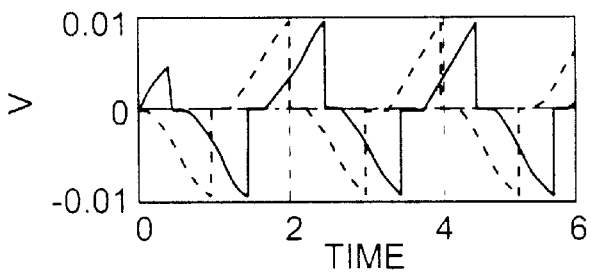
Figure 14I:
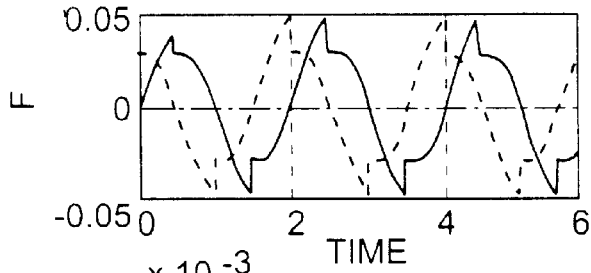
Figure 14J:
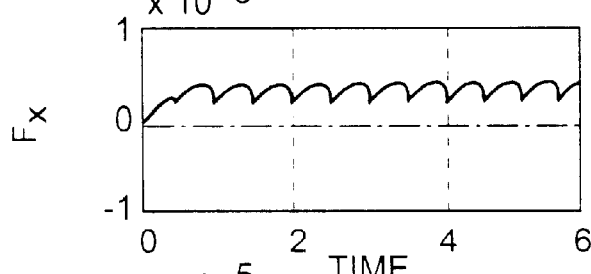
Figure 14K:
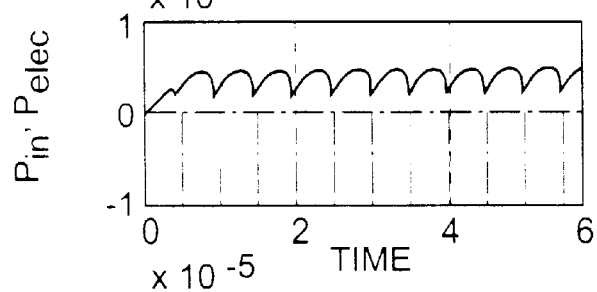
Figure 14L:
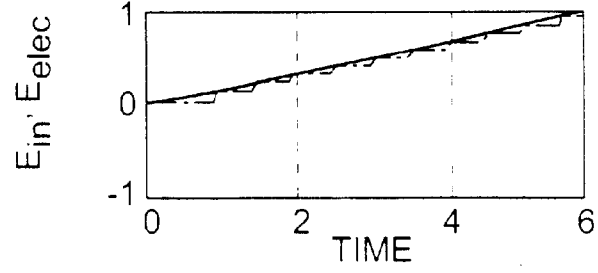
Figure 15A:
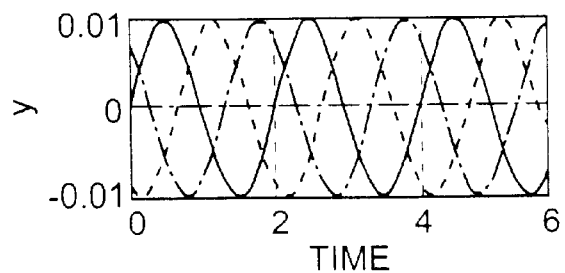
FIGS. 15a–15l show waveforms corresponding to the response of a system with three transducers.
Figure 15B:
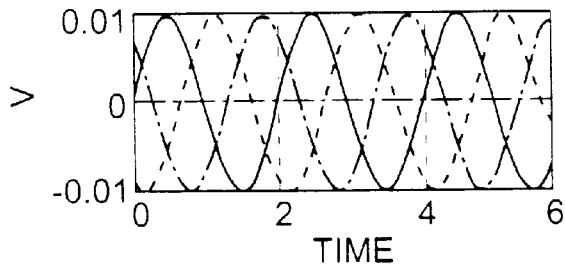
Figure 15C:
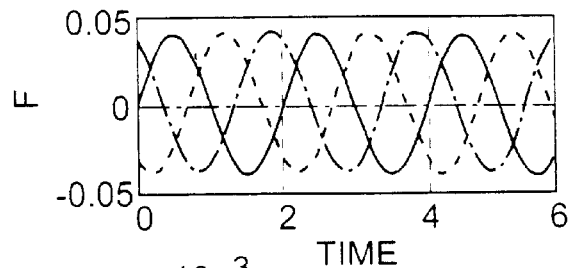
Figure 15D:
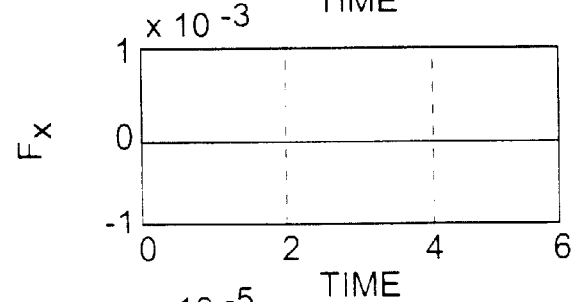
Figure 15E:
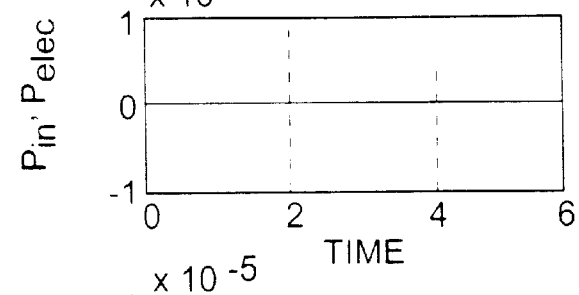
Figure 15F:
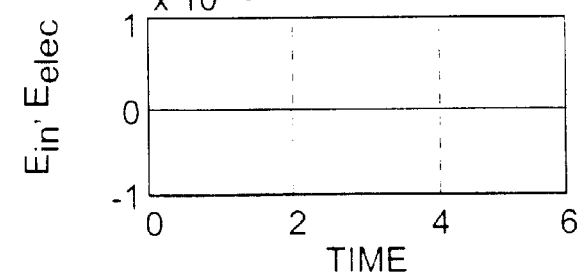
Figure 15G:
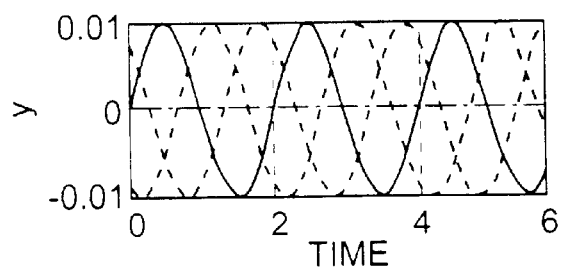
Figure 15H:
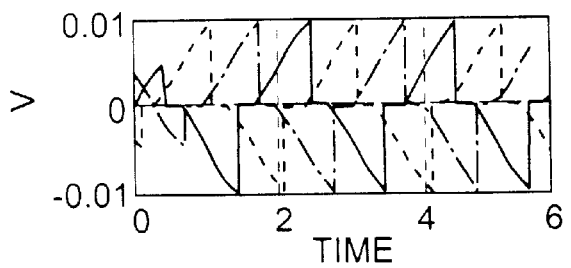
Figure 15I:
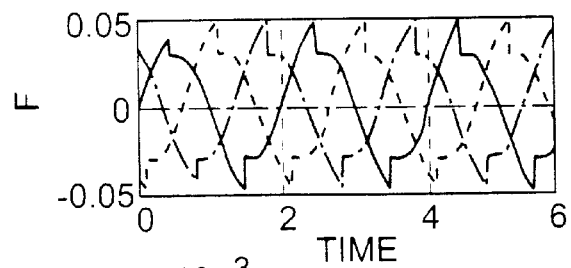
Figure 15J:
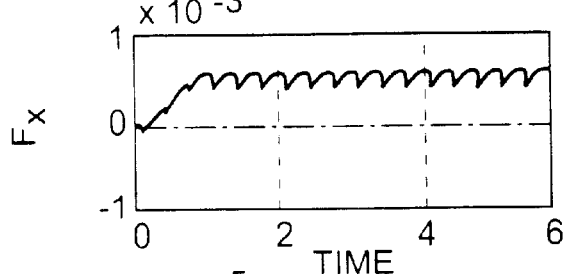
Figure 15K:
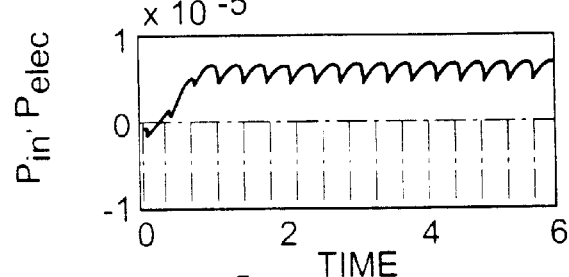
Figure 15L:
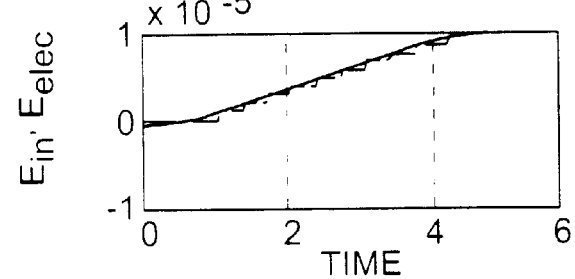
Figure 16A:
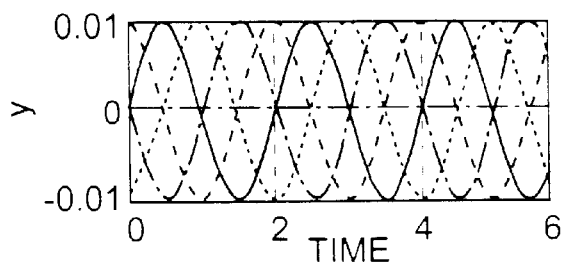
FIGS. 16a–16l show waveforms corresponding to the response of a system with four transducers.
Figure 16B:
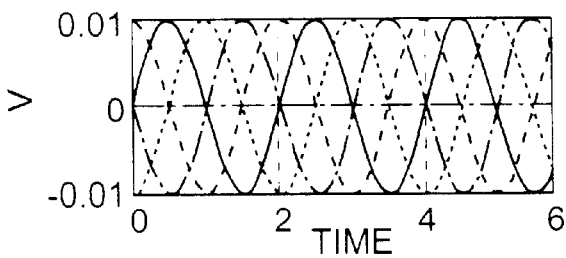
Figure 16C:
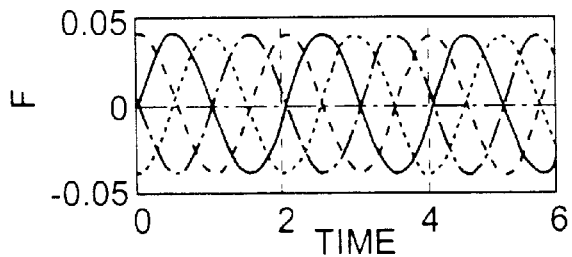
Figure 16D:
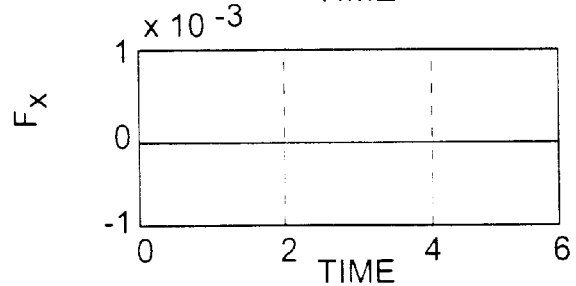
Figure 16E:
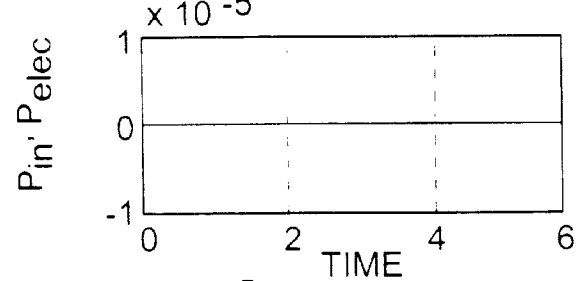
Figure 16F:
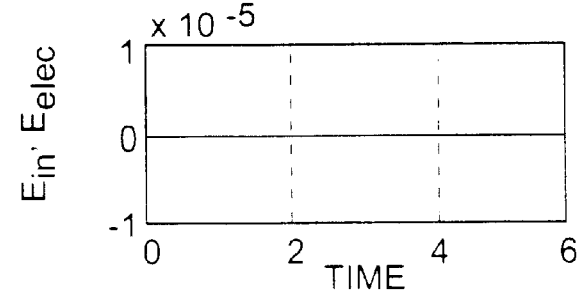
Figure 16G:
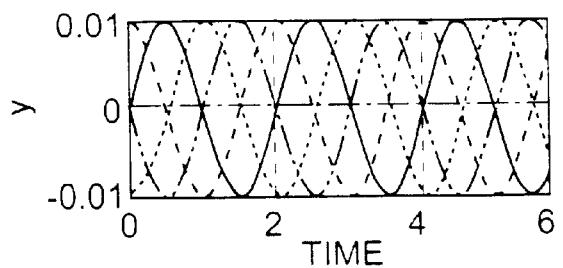
Figure 16H:
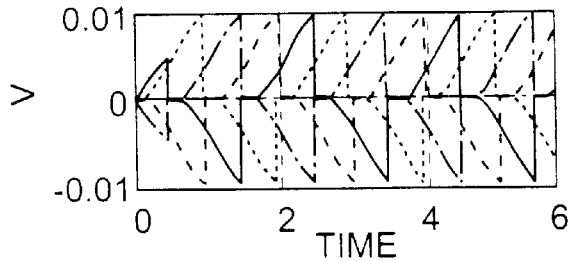
Figure 16I:
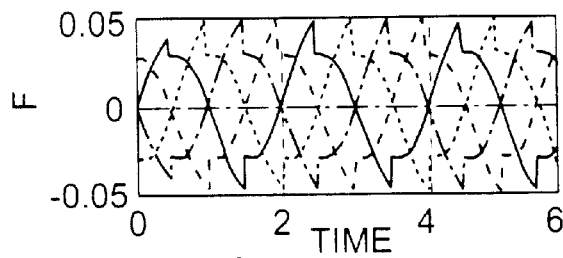
Figure 16J:
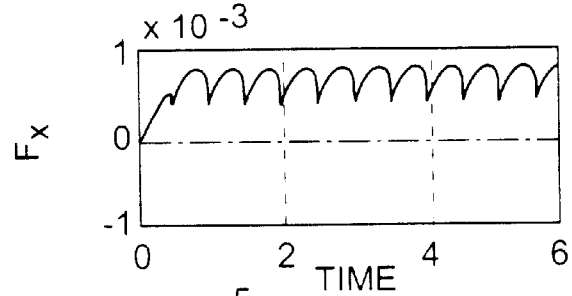
Figure 16K:
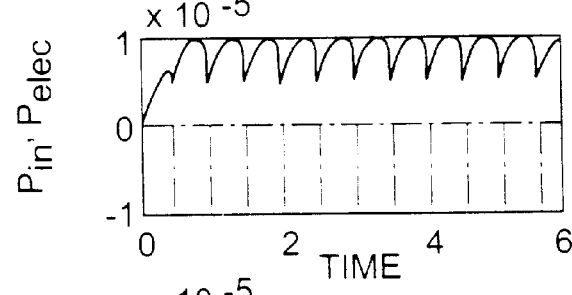
Figure 16L:
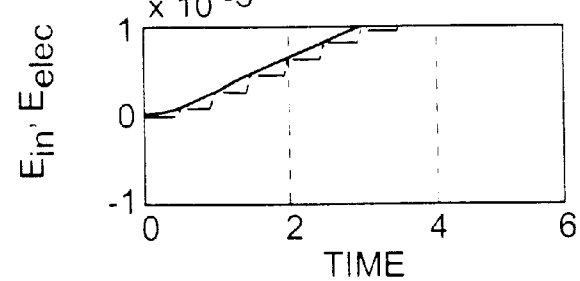

FIGS. 14g–14l show the corresponding waveforms when the system is connected to a harvesting circuit. In this case, since electrical energy is being removed from the system, the net force on the cam is not zero (FIG. 14j). However, as can be seen from FIG. 14k, no mechanical power flows out of the device. As seen from FIG. 14l, the mechanical energy input in the device balances the electrical energy harvested. Thus the coupling coefficient of an energy harvesting system using this configuration can be as high as 1. That is 100% of the mechanical energy supplied to the device can be extracted as electrical energy. In the presence of loss mechanisms such as friction, and cam flexibility, the conversion efficiency will be lower that 100%. However, even in the presence of such losses the efficiency will be higher than the efficiency that would be achieved without reusing the mechanical elastic energy.

FIGS. 15 and 16 show similar waveforms for a system using three transducer elements and a system using four transducer elements, respectively. Three transducers at 60 and 120 degrees of phase will produce the desired cancellation. Four transducers at 90 degrees of phase between the transducer elements will produce the desired effect.

Figure 17A:
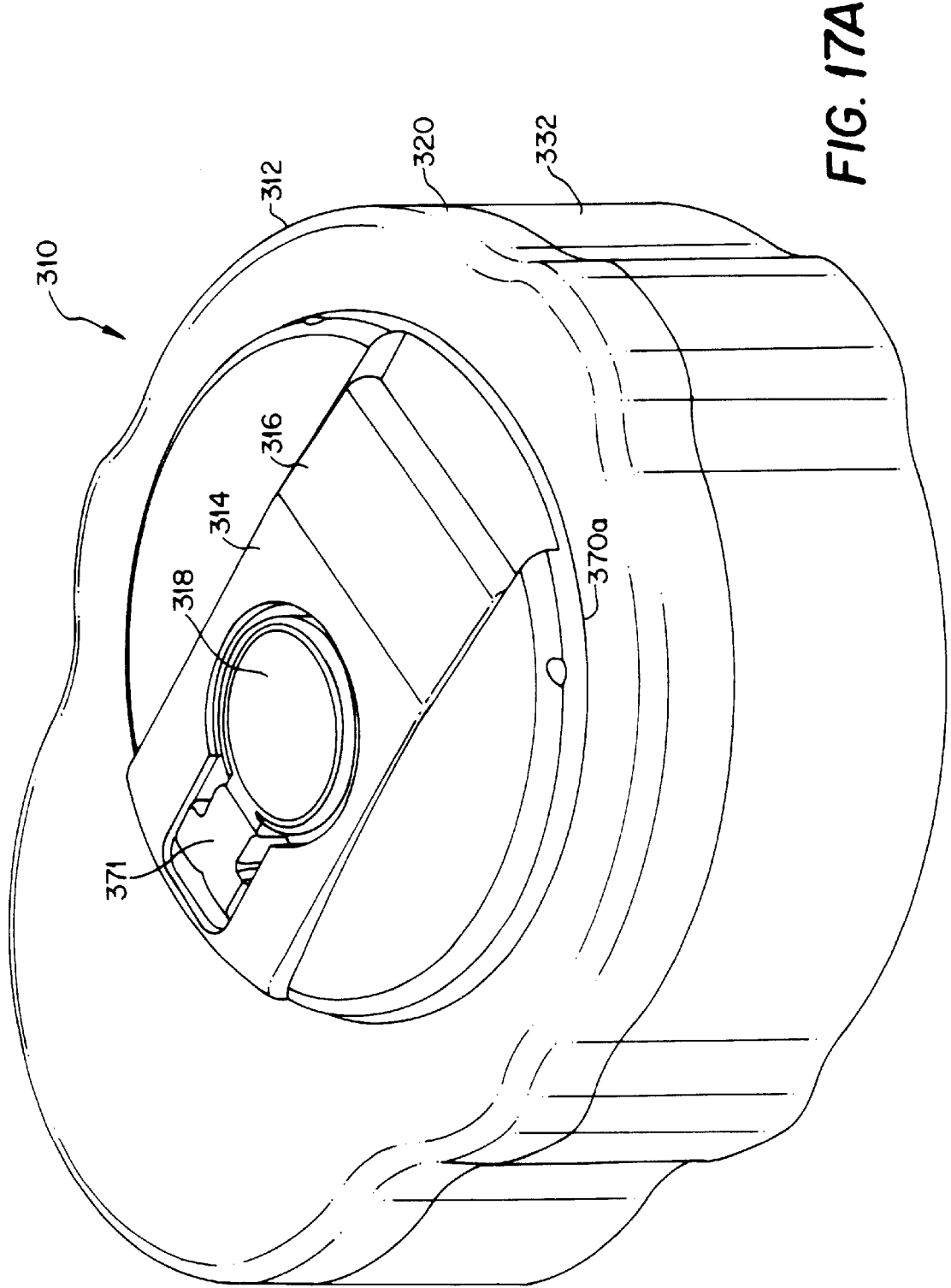
FIG. 17a is a perspective view of a piezoelectric generator according to the invention.
Figure 17B:
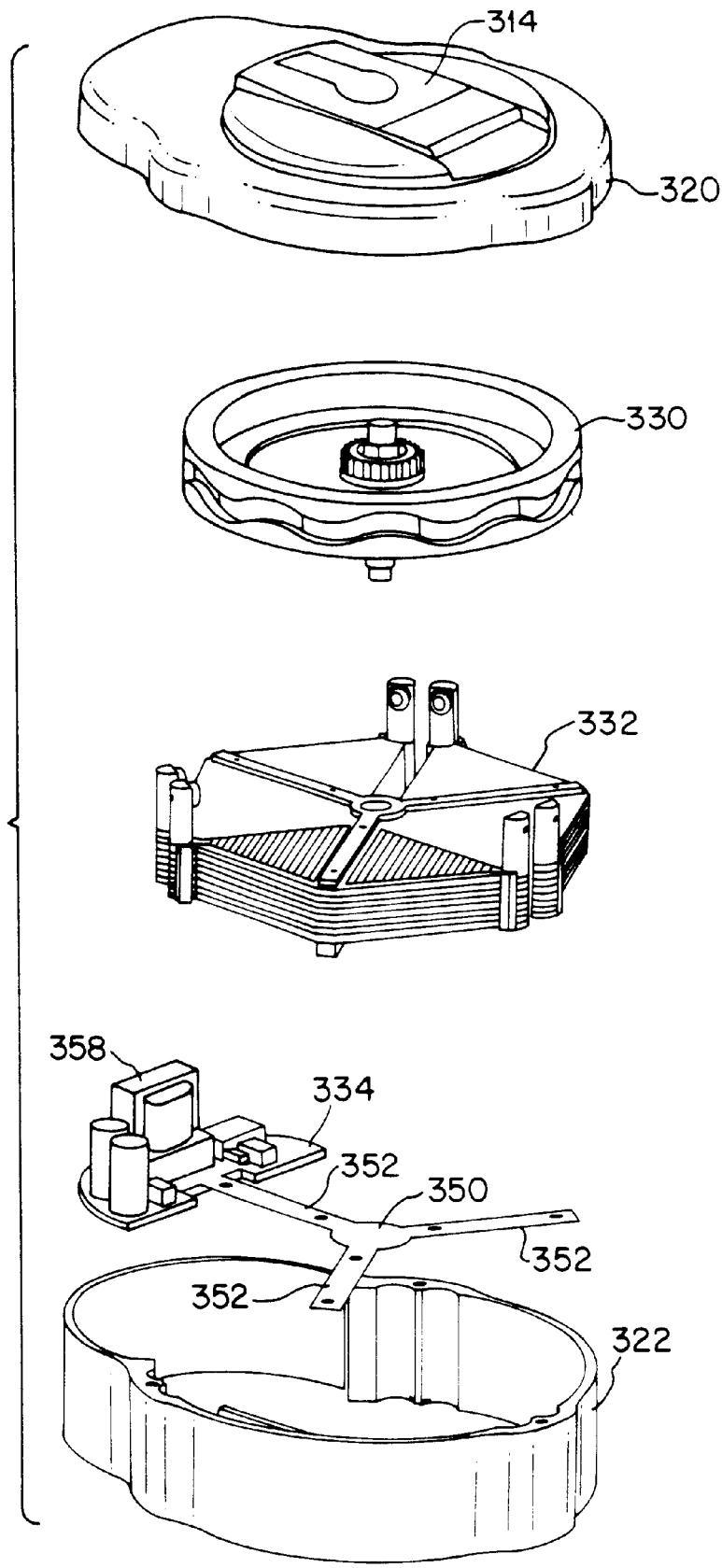
FIG. 17b is an exploded view of the generator.

Referring to FIG. 17a, a handheld piezoelectric generator 310, which functions in the above described quasi-static mode in which non-converted mechanical energy is redistributed within the system, includes a housing 312 and a crank handle 314. Handle 314 is coupled to housing 312 for rotation relative thereto, and includes an arm 316 and a finger grasp 318. Referring also to FIG. 17b, housing 312 includes a case 320 and a case cover 322 attached to case 320 with screws, not shown. Located within housing 312 are a wave plate 330, a blade assembly 332, and a circuit board 334.

Figure 18:
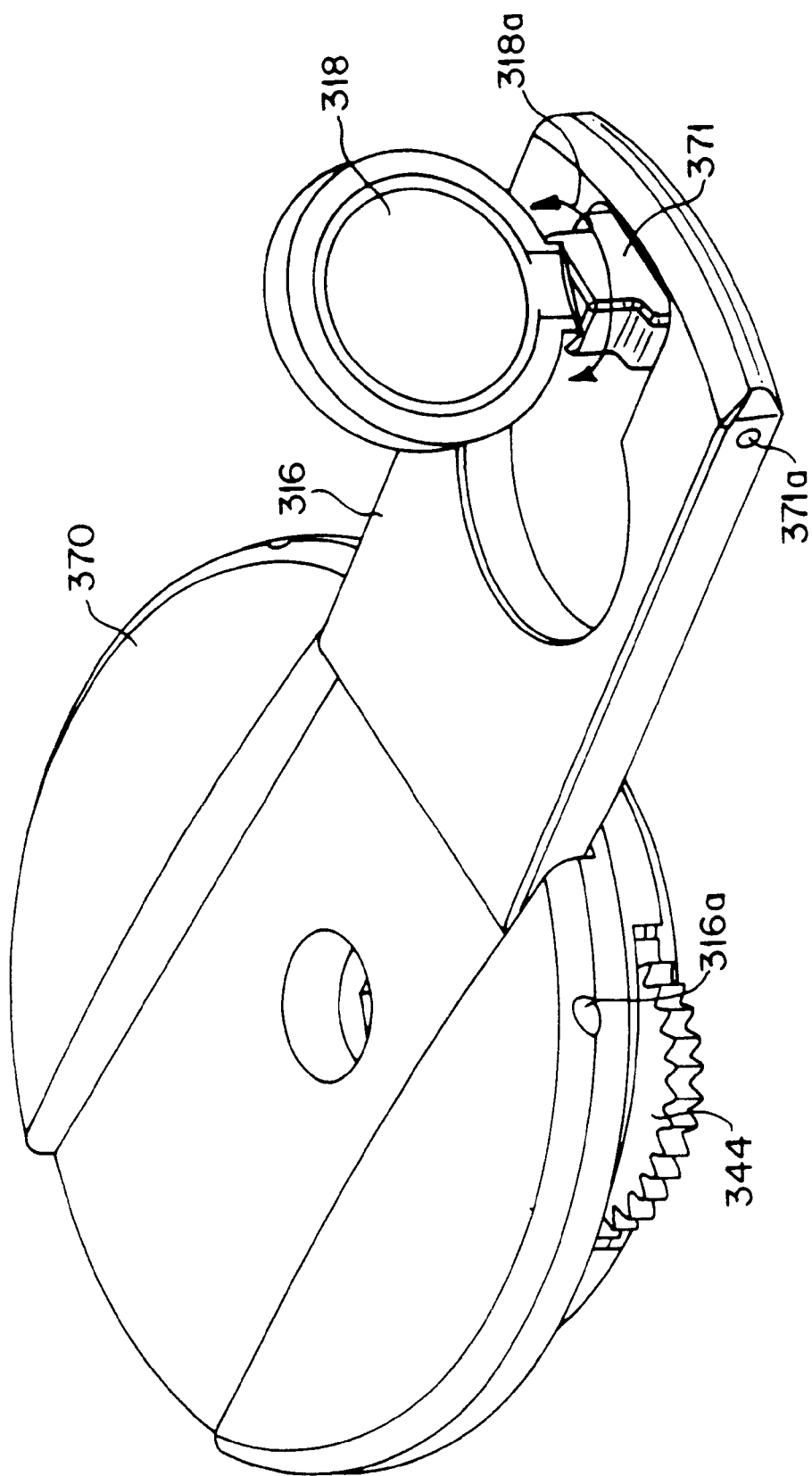
FIG. 18 shows a crank handle and insert of the generator with the crank handle in an open position.

Referring to FIGS. 17a and 18, handle arm 316 is mounted to an insert 370 by a pin 316a such that handle arm 316 can be moved from the closed position of FIG. 17a to the open, actuation position of FIG. 18. Finger grasp 318 is coupled to handle arm 316 by a member 371 that is mounted to handle arm 316 by a pin 371a such that finger grasp 318 can be moved from the closed position of FIG. 17a to the open, actuation position of FIG. 18. Finger grasp 318 is mounted to member 371 to rotate along arrow 318a. Insert 370 is received within an opening 370a in case 320.

Figure 19:
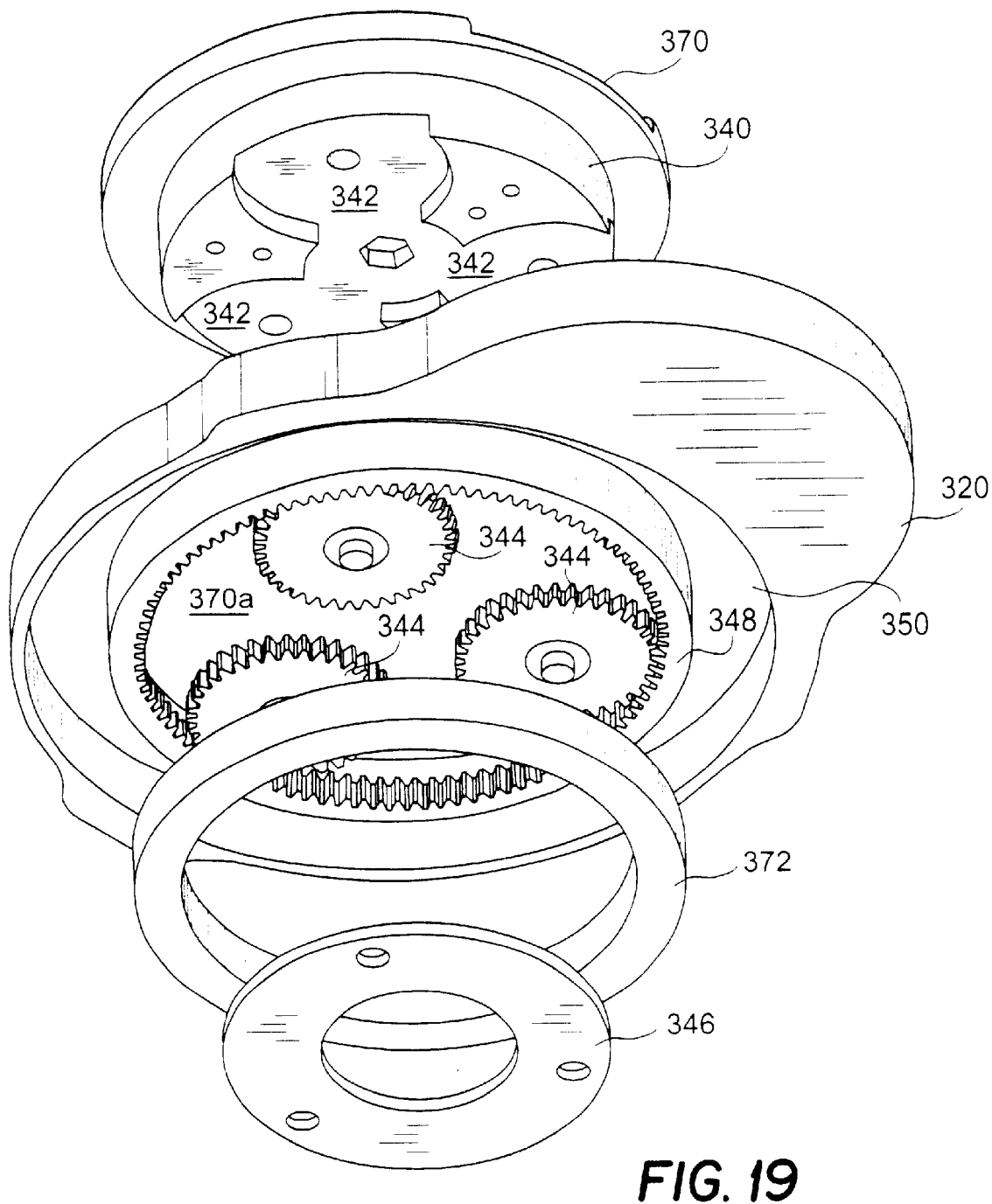
FIG. 19 is an exploded view of a case of the generator.

Referring to FIGS. 18 and 19, insert 370 has an inner side 340 defining three cut-out regions 342. Mounted within each cut-out region 342 is a gear 344. Below gears 344 is a washer 346 for holding the gears in place. As shown in FIG. 19, case 320 includes a stationary internal gear ring 348 extending from an inner surface 350 of case 320. Gears 344 extend through opening 370a in case 320 and mate with gear ring 348. In operation, rotation of handle 314, for example, in the clockwise direction, causes rotation of insert 370 and gears 344 in the clockwise direction. The mating of gears 344 with gear ring 348 causes gears 344 to rotate about their own axes in the counterclockwise direction at four times the speed of the clockwise rotation. Positioned around gear ring 348 and against inner surface 350 is a bearing 372.

Figure 20A:
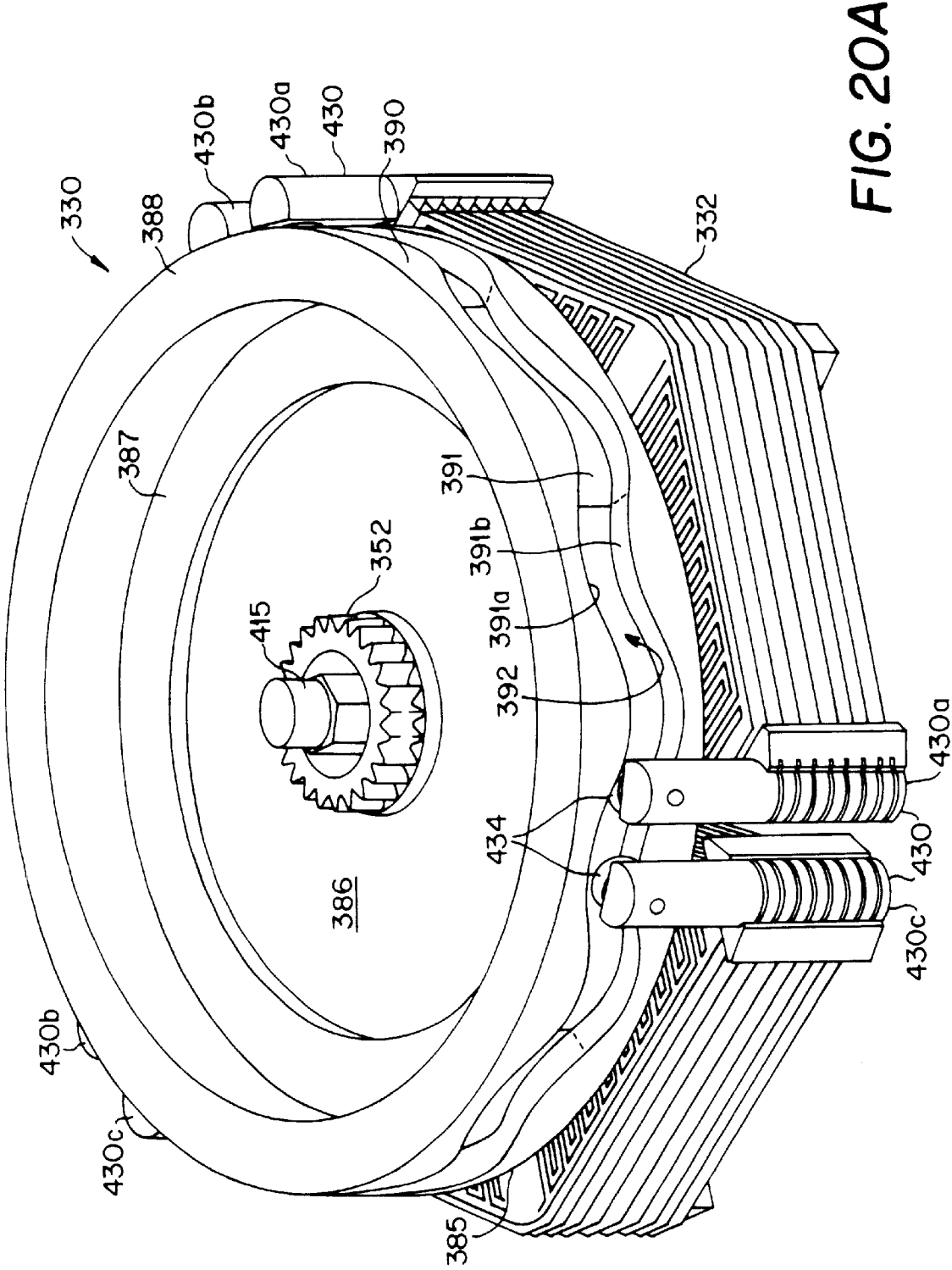
FIG. 20a is a perspective view of a wave plate and a blade assembly of the generator.
Figure 20B:
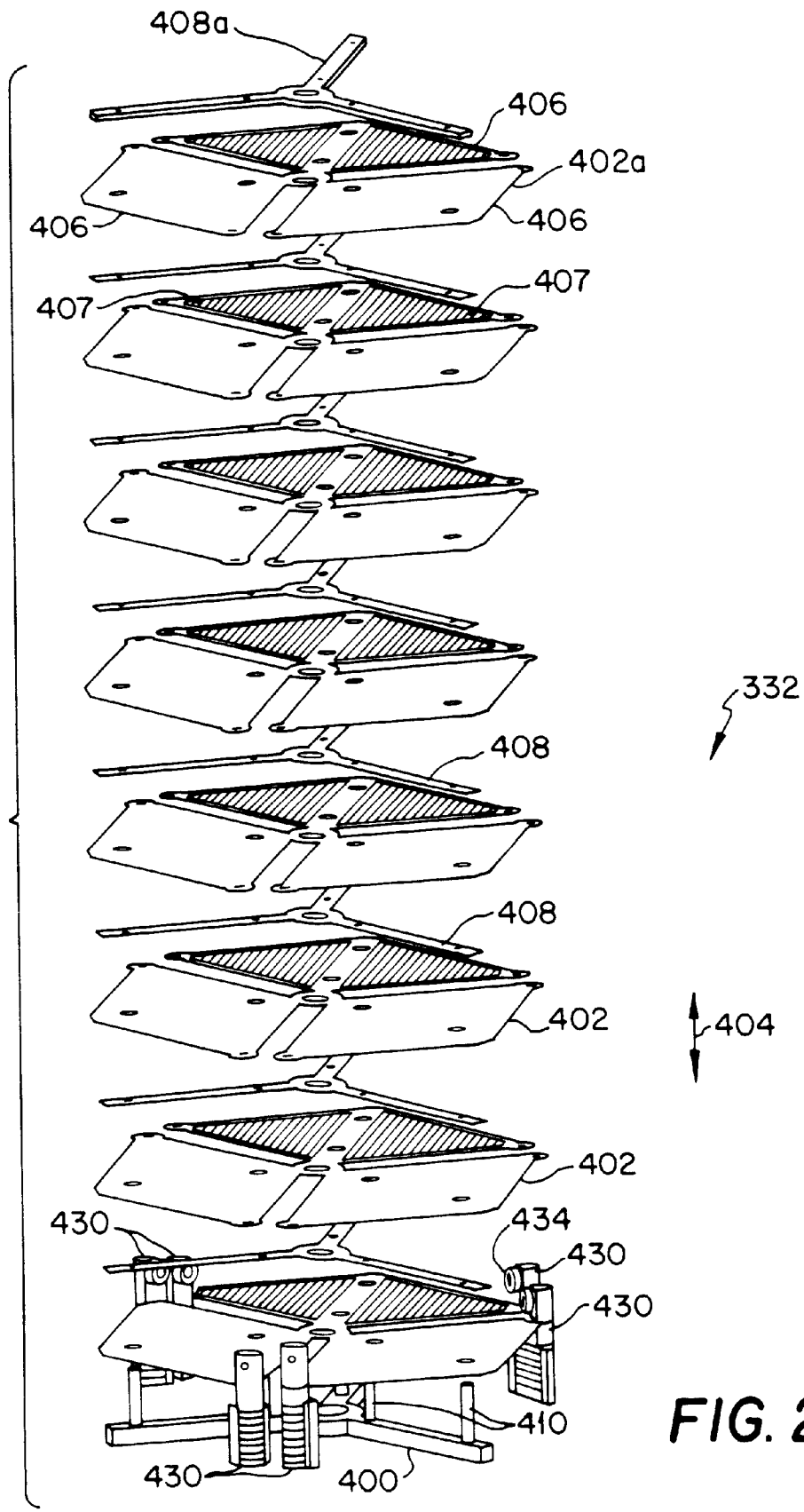
FIGS. 20b is an exploded view of the blade assembly.
Figure 20C:
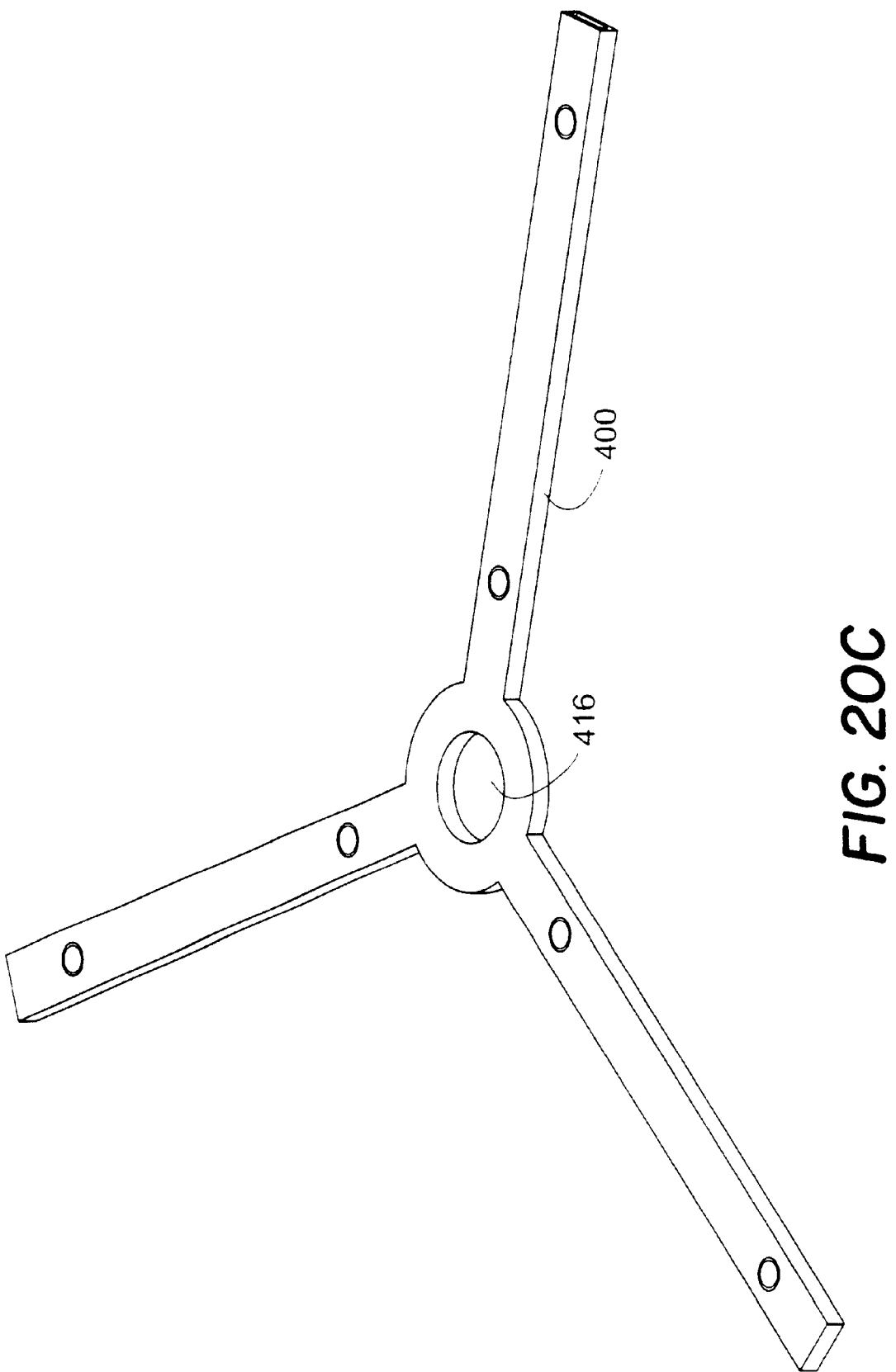
FIGS. 20c–20f show various components of the blade assembly.
Figure 20D:
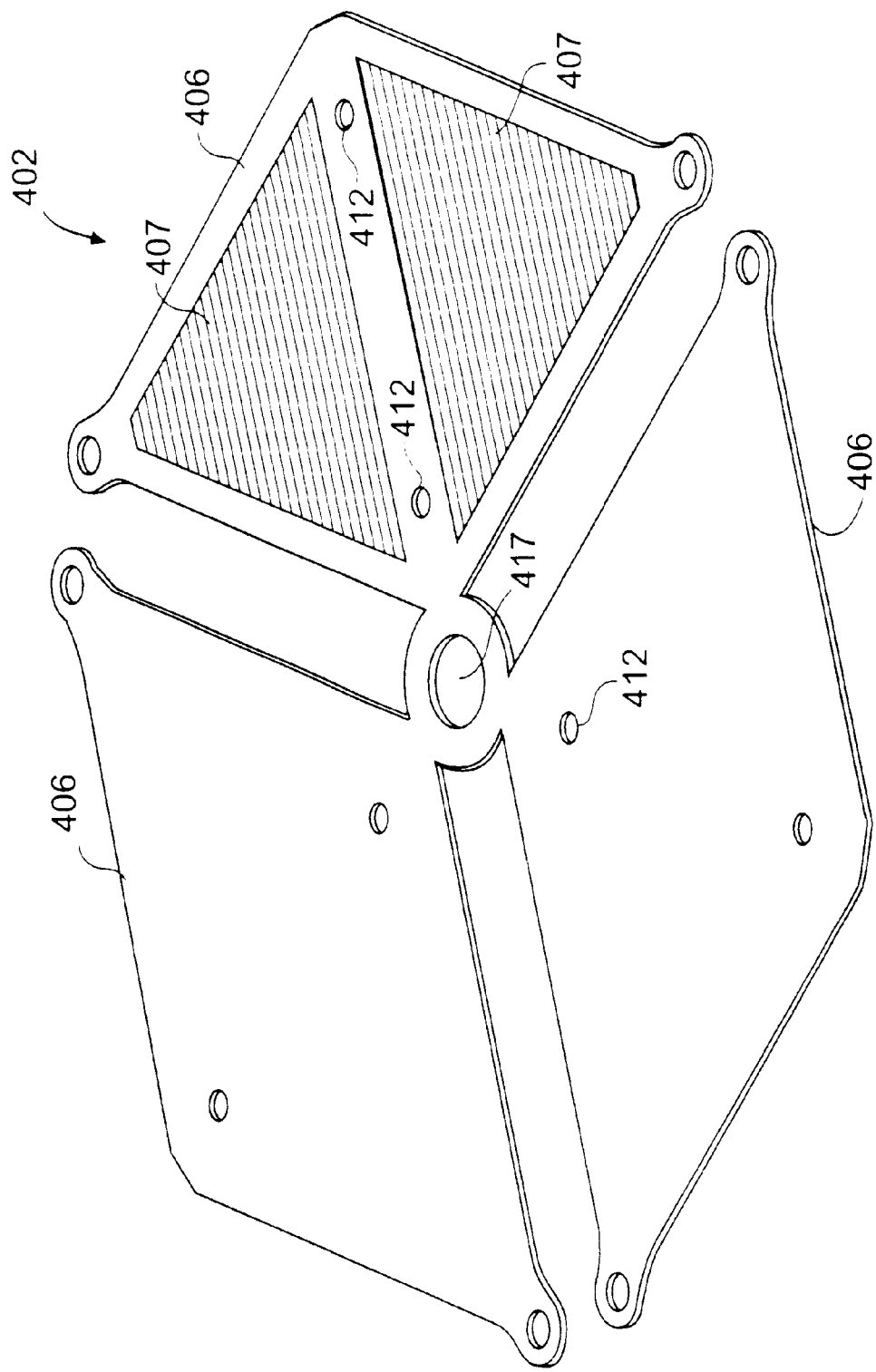

Referring to FIG. 20a, wave plate 330 includes a gear 352 that is received between gears 344. Clockwise rotation of gears 344 causes counterclockwise rotation of gear 352 and wave plate 330. The relative number of gear teeth in gear ring 348, gears 344, and gear 352 is such that, for example, for each rotation of handle 314, gear 352 rotates four times. Wave plate 330 includes a base section 386 and gear 352 is mounted to base section 386. Base section 386 has a ledge 387 against which bearing 372 rests, and extending upward from a bottom surface 385 of wave plate 330 is a peripheral wall 388. Peripheral wall 388 has an outer face 390 with a cut-out 391 bounded by upper and lower surfaces 391a, 391b each formed in a matching sinusoidal wave pattern 392. Wave pattern 392 includes 10 waves peak-to-peak.

Referring also to FIG. 20b–20e, blade assembly 332 includes a support 400 (FIG. 20c) and eight layers 402 of piezoelectric material mounted to support 400 and bendable relative to support 400 in the directions of arrow 404. There are three distinct regions 406 per layer 402 (FIG. 20d), each with two piezoelectric elements 407. Layers 402 are separated by shims 408 (FIG. 20e), and top layer 402a is separated from a bottom surface 385 (FIG. 20a) of wave plate 330 by a top shim 408a. Extending from support 400 are six pins 410 that extend through holes 412 and 414 defined in layers 402 and shims 408, respectively. A shaft 415 extends through holes 416, 417 and 418 defined in support 400, layers 402, and shims 408, respectively, and through a hole 410 defined in wave plate 330. A bearing (not shown) is located between shaft 415 and wave plate 330.

Figure 20F:
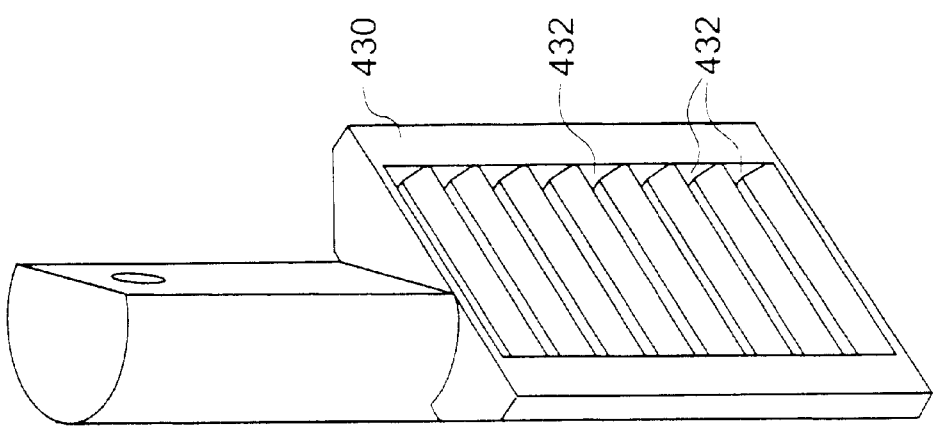
Figure 20E:
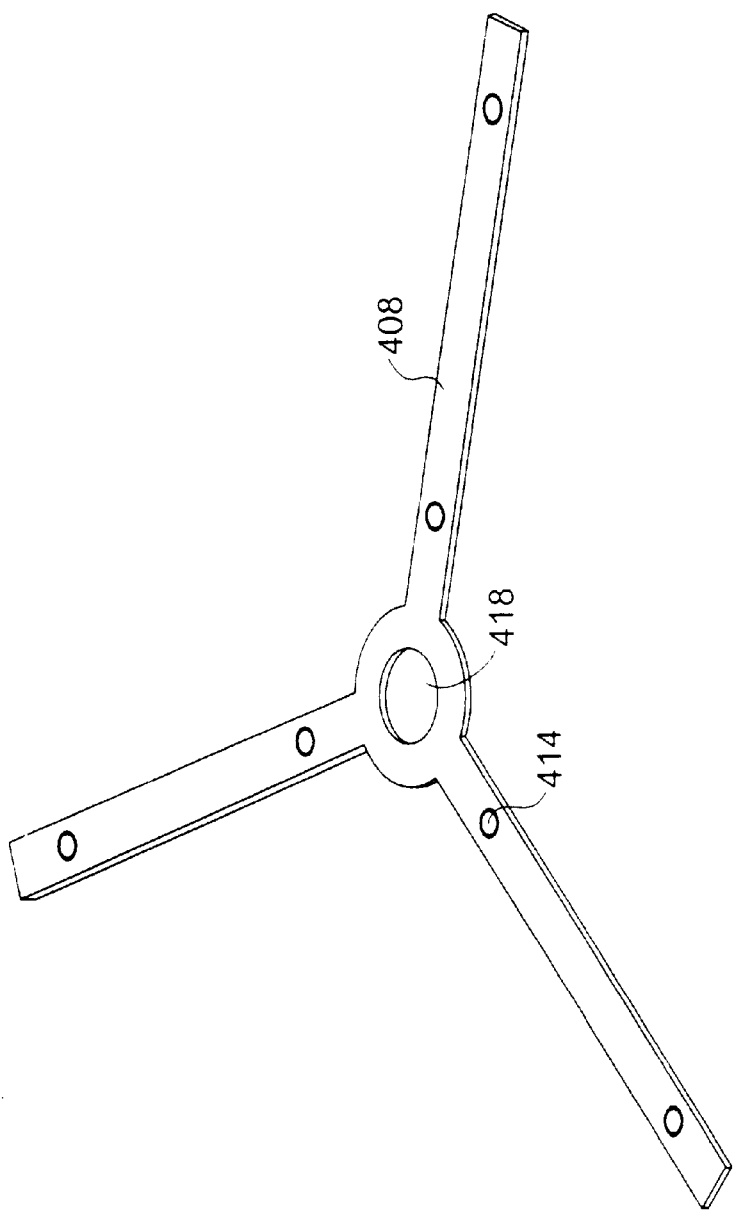

Blade assembly 332 is coupled to wave plate 330 by six coupling mounts 430 (FIG. 20f). Each coupling mount 430 defines eight slots 432, each slot 432 for receiving one layer 402. Each coupling mount 430 has a bearing 434 mounted thereto (FIG. 20a) that rides within cut-out 391 in wave plate 330. Bearings 434 provide a low friction coupling between wave plate 330 and blade assembly 332.

Coupling mounts 430 define three pairs of coupling mounts 430a, 430b, 430c. The spacing of the six coupling mounts stabilizes wave plate 330 and blade assembly 332, and spaces the timing of maximum deflection of the blades. The two coupling mounts 430 within each pair are in phase and the different pairs are 120 degrees out of phase. As wave plate 330 rotates, blade assembly 332 remains rotationally stationary while bearings 434 ride up and down following sinusoidal patter 392. The motion of bearings 434 causes each layer 402 to flex upward and downward, straining the piezoelectric elements. The ten sine waves in pattern 392 and the six contact points between blade assembly 332 and wave plate 330 define three different phases of contact between pattern 292 and blade assembly 332, each phase corresponding to one of the pairs of coupling mounts 430a, 430b, 430c. Bounding bearings 434 between upper and lower sinusoidal surfaces 391a, 391b provides for maximum deflection of layers 402 in both the upward and downward directions.

Figure 21:
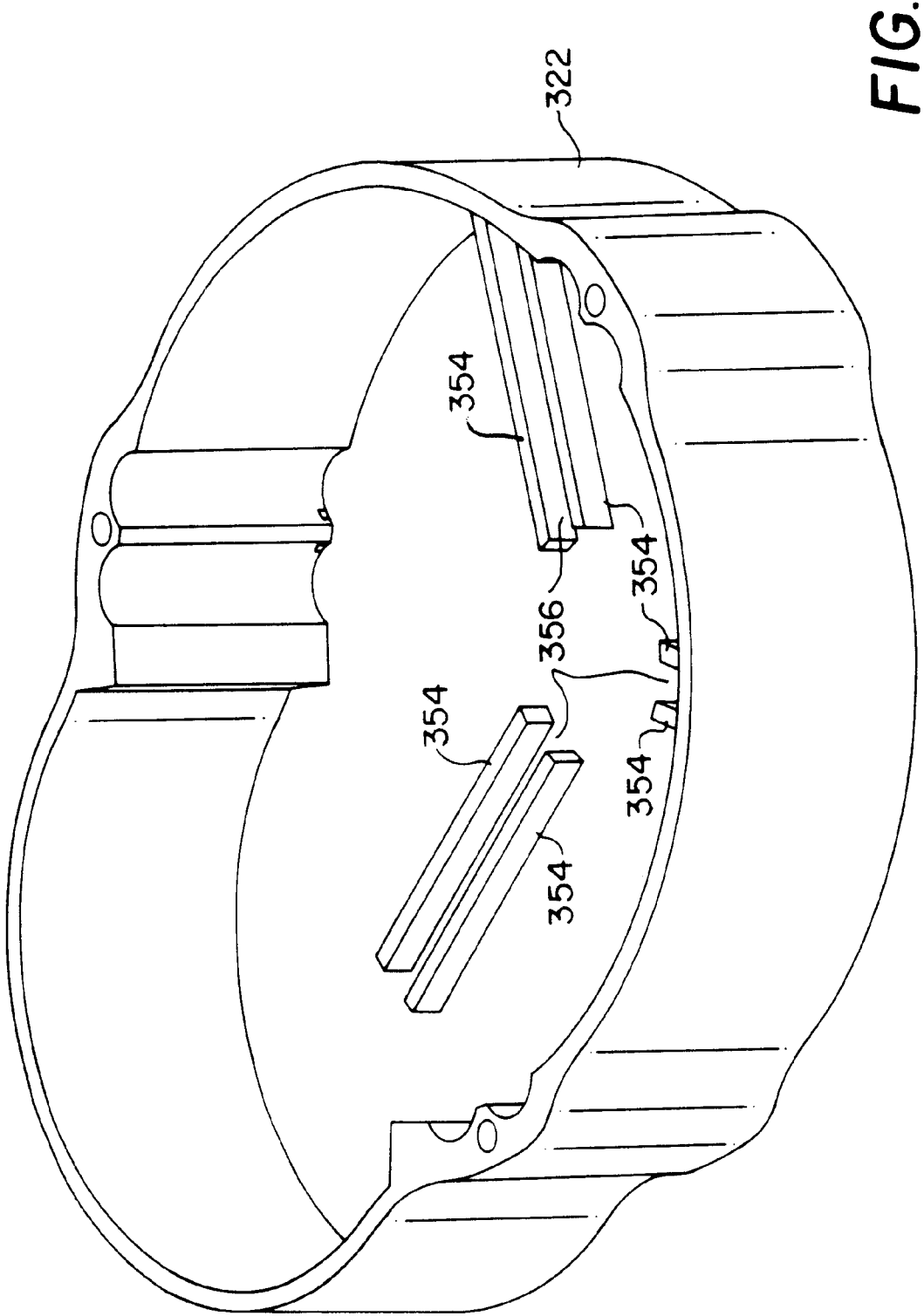
FIG. 21 is a perspective view of a case cover.

Referring to FIGS. 17b and 21, circuit board 334 has a support 350 with three arms 352. Case cover 322 has three sets of rails 354 defining slots 356 for receiving arms 352. Mounted to circuit board 334 is circuitry 358 such as described above.

Generator 310 is sized to fit in a users palm having an overall length of about 4.5 inches, and overall width of about 3 inches, and an overall height of about 1.2 inches. Generator 310 can be an independent device with a power cord that plugs into a device being powered, or generator 310 can be an integral component of the device being powered.

Rather than turning the handle, the generator can be actuated by a squeezing action or by pulling a string.

Figure 24:
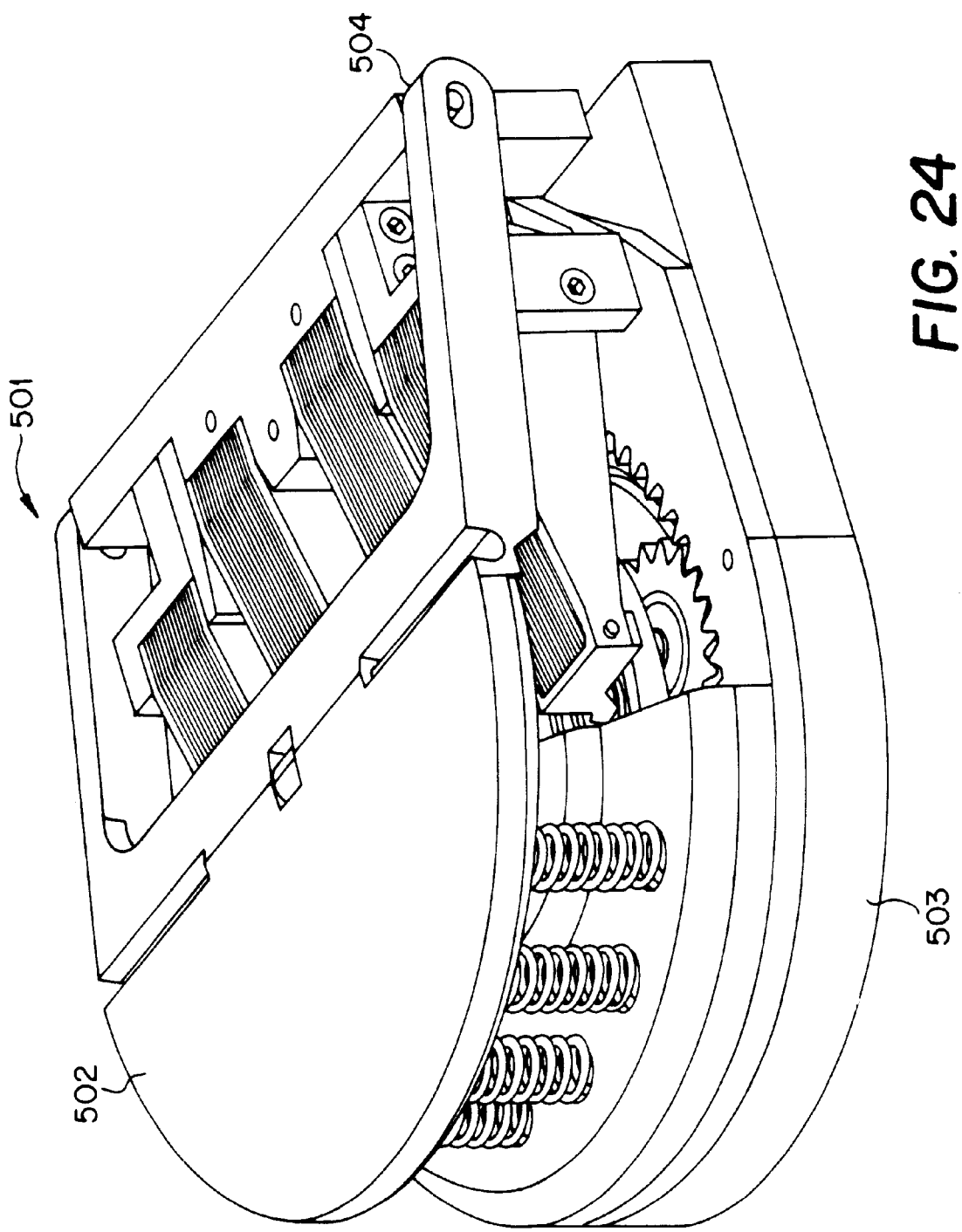
FIG. 24 is a perspective view of an alternative embodiment of a piezoelectric generator according to the invention.

Referring to FIG. 24, an alternative embodiment of a piezoelectric generator 501, which functions in the above described quasi-static mode in which non-converted mechanical energy is redistributed within the system, can be embedded within the heel of a boot. The device 501 includes a top plate 502 and bottom plate 503 that are connected to one another through a pivot 504. Stepping on the heel of the boot causes top plate 501 to be pressed towards bottom plate 503.

Figure 25:
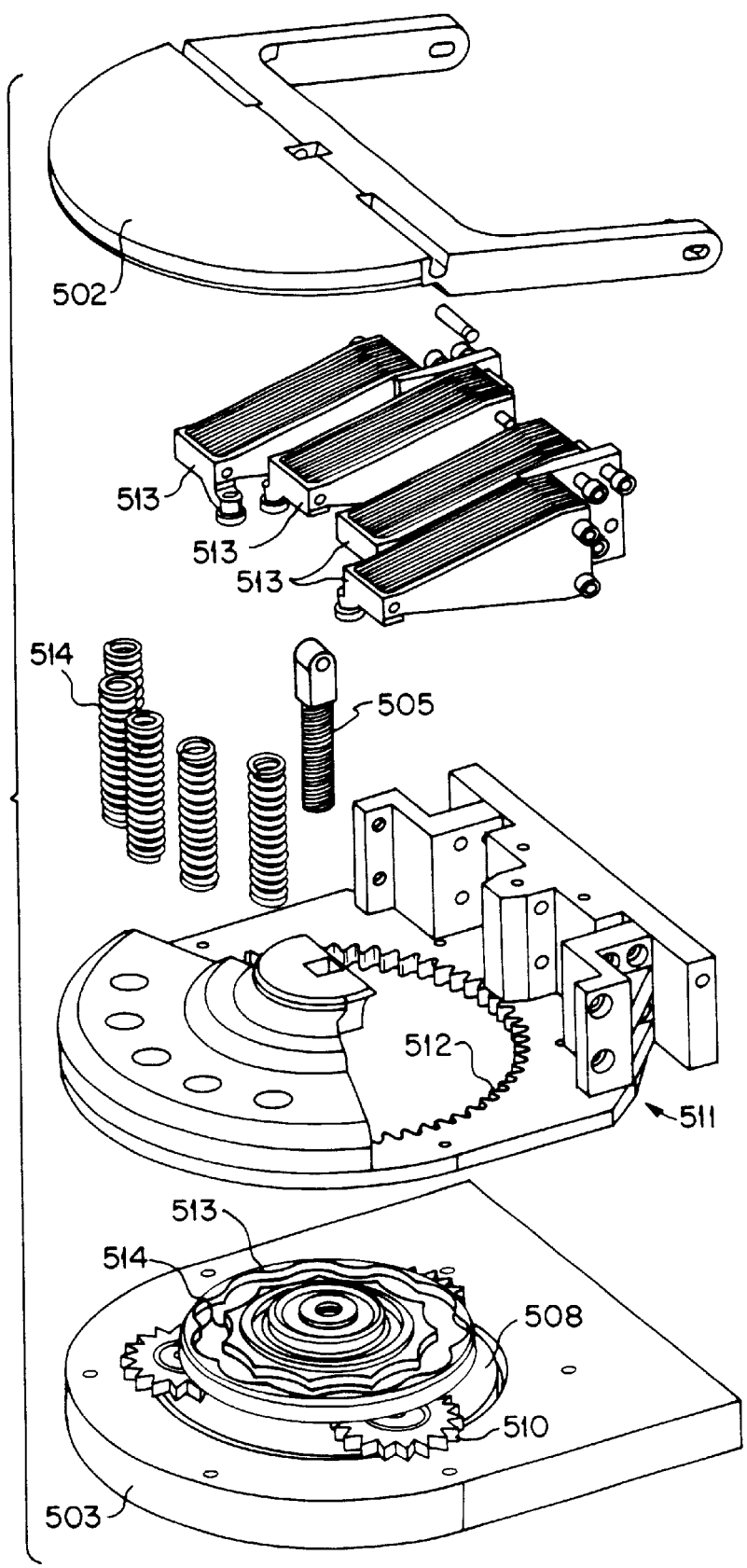
FIG. 25 is an exploded view of the piezoelectric generator of FIG. 24.
Figure 26:
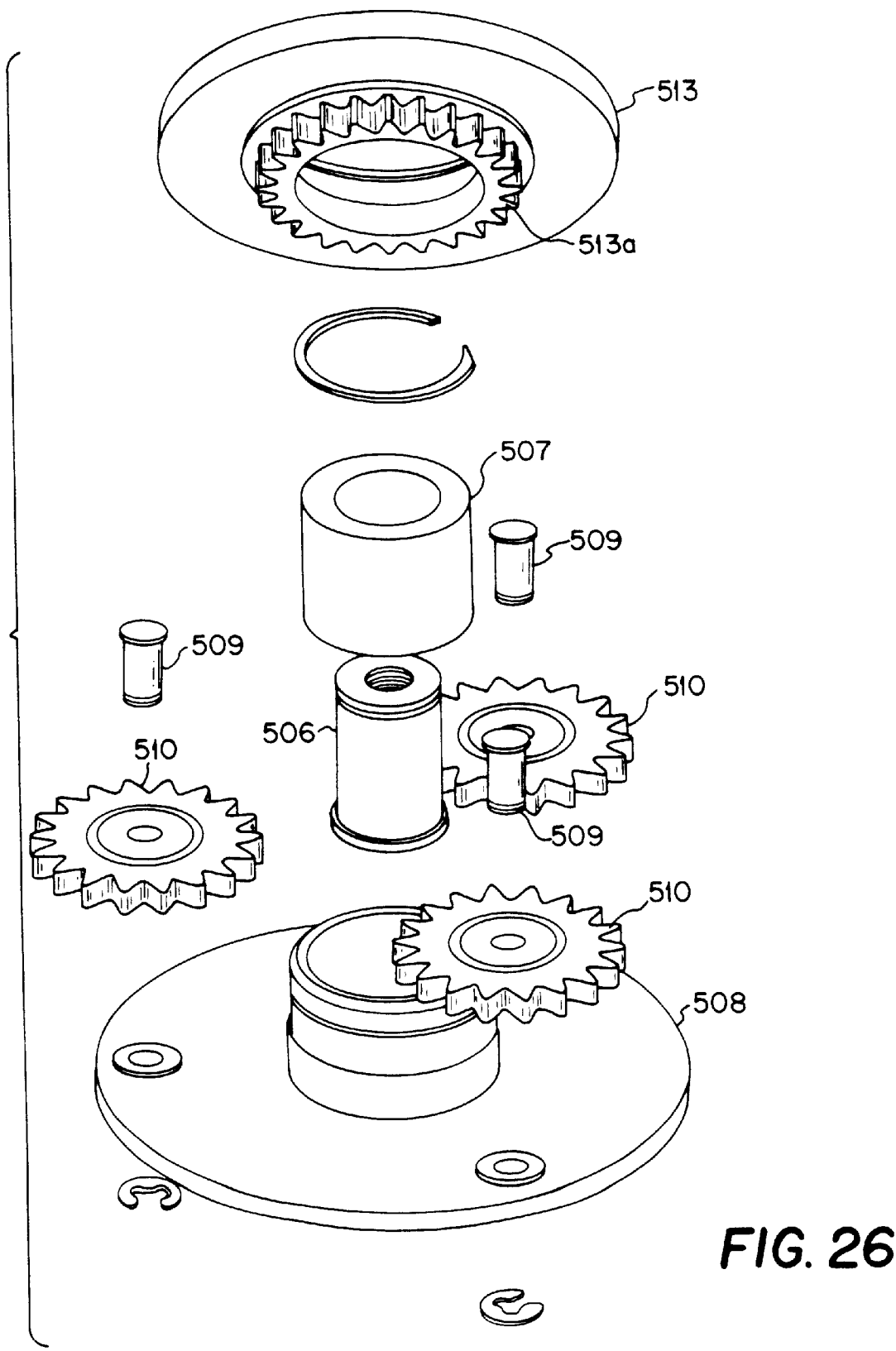
FIG. 26 is a further exploded view of the piezoelectric generator of FIG. 24.

Referring to FIG. 25, top plate 502 is connected to a helical screw 505 and compression springs 514. Referring also to FIG. 26, as helical screw 505 is pushed down through a matching helical nut 506, screw 505 forces the helical nut to rotate. The helical nut 506 is mated to a one-way clutch bearing 507, which is in turn mated to an insert 508, thus causing the insert to rotate along with the helical nut. Insert 508 has three holes 508a that receive pins 509 for holding gears 510. As shown in FIG. 25, a mounting plate 511 includes a stationary internal gear ring 512 which mates with gears 510. In operation, downward motion of top plate 502 causes counter-clockwise rotation of helical nut 506, insert 508 and gears 510. The mating of gears 510 with the internal gear 512 causes gears 510 to rotate about their own axes in clockwise rotation at, for example, 2.3 times the speed of the counter-clockwise rotation.

A wave plate 513 includes a gear 513a fixed to the bottom side of the wave plate. Gear 513a is received between gears 510 such that counter-clockwise rotation of gears 510 causes clockwise rotation of wave plate 513. The relative number of gear teeth in internal gear 512, gears 510, and wave plate gear 513a is such that, for example, for each rotation of helical nut 506, the wave plate rotates 3.5 times. Wave plate 513 includes a cut-out 514 having a nearly sinusoidal wave pattern. The wave pattern includes eleven waves peak-to-peak.

As the heel is lifted off the ground, the compression springs 514 causes the top plate and bottom plate to move apart again. As the helical nut 505 moves up, the one-way clutch bearing 507 allows the helical nut 506 to rotate freely (without causing rotation of the gears and wave plate).

Figure 27:
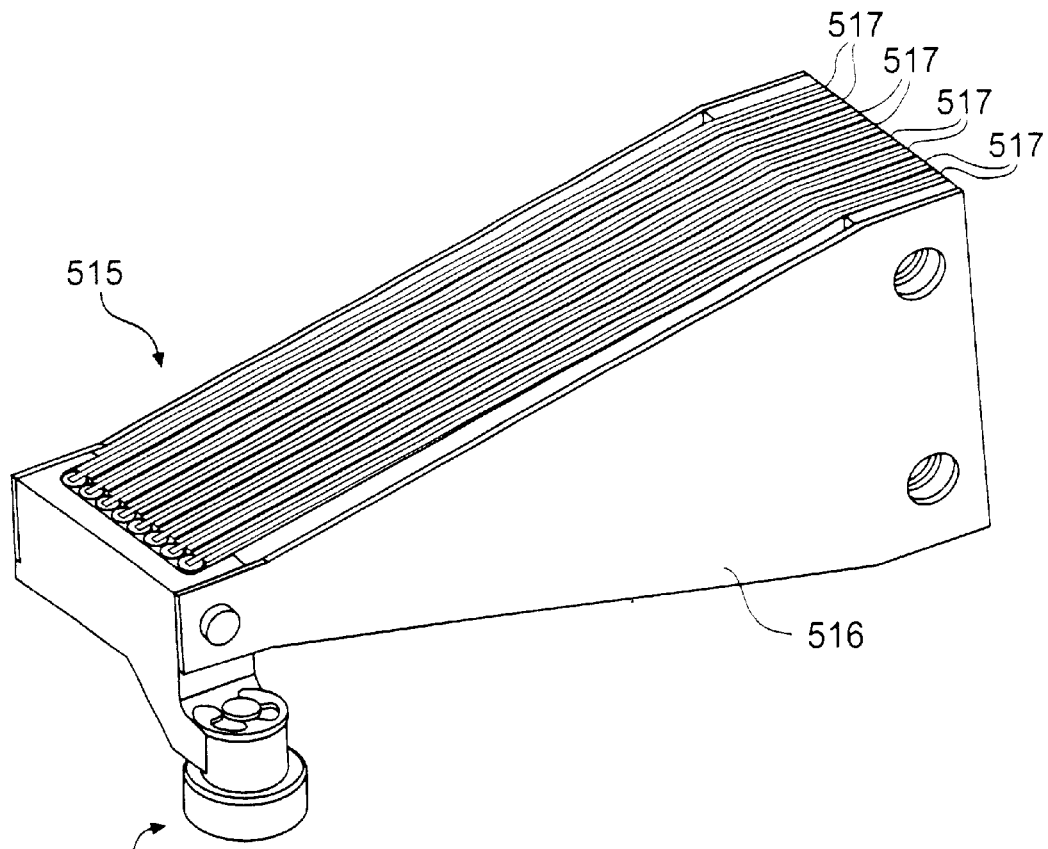
FIG. 27 shows a blade assembly of the piezoelectric generator of FIG. 24.
Figure 28:
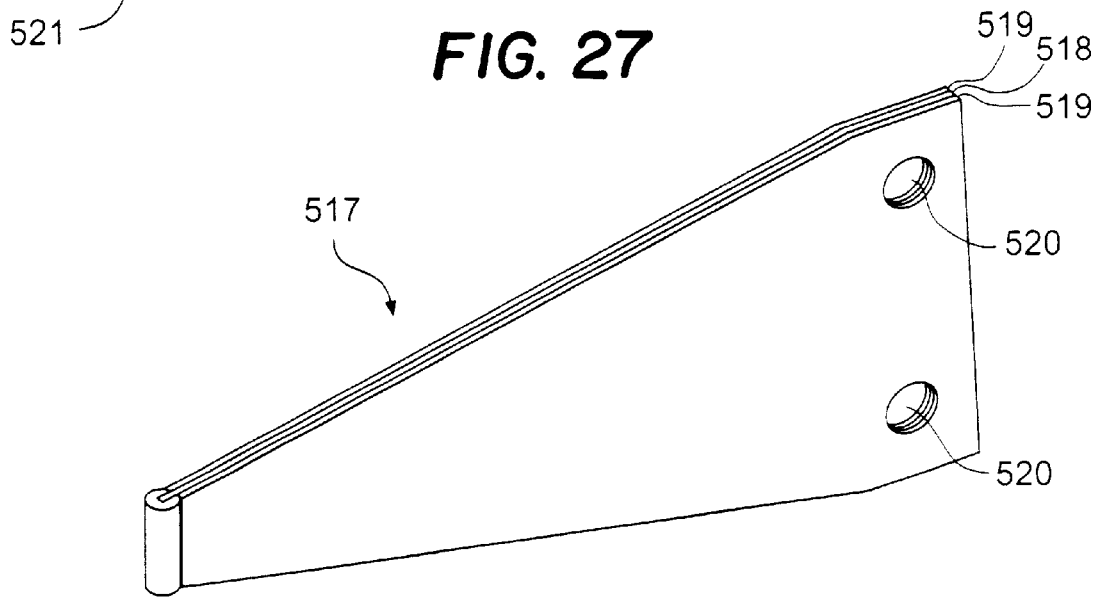
FIG. 28 shows a piezoelectric bimorph of the blade assembly of FIG. 27.

Referring also to FIGS. 27 and 28, blade assemblies 515 include a support 516, and eight layers of piezoelectric bimorphs 517. The layered construction of each piezoelectric bimorph includes a shim 518 and a piezoelectric element 519 on each side of the shim. The bimorphs are clamped at the base through holes 520. Each blade assembly 515 is coupled to the wave plate through a bearing 521 located in cut-out 514. Bearings 521 provide a low friction coupling between wave plate 513 and the blade assembly 515.

As wave plate 513 rotates, the bearings 521 move from side to side in the sinusoidal wave pattern 514. The motion of the bearings causes each blade assembly to flex side to side. The four bearings 521 and the eleven sine waves in pattern 514 define four phases between pattern 514 and the blade assemblies 515. The four blade assemblies move with 90 degrees of phase between them, to produce the desired redistribution of mechanical energy in the system.

Figure 22A:
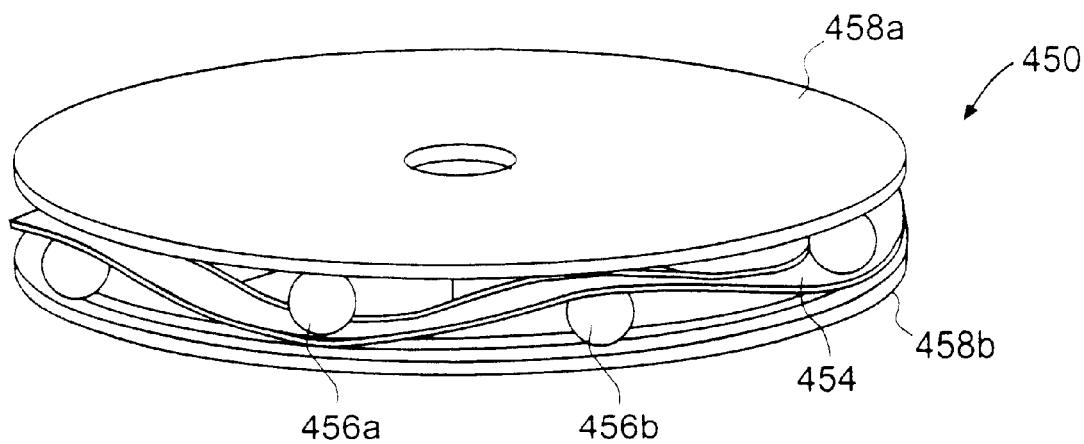
FIGS. 22a and 22b are perspective views of an alternative embodiment of a generator mechanism, a top plate of the mechanism shown removed for illustrative purposes in FIG. 22b.
Figure 22B:
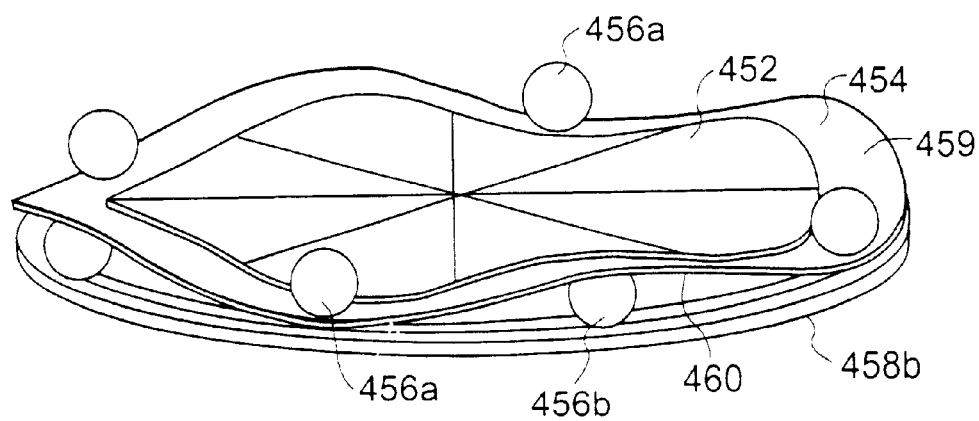

FIGS. 22a and 22b show an alternative embodiment of the invention. A generator mechanism 450 includes a segmented piezoelectric disk 452 bonded to a circular plate 454. Plate 454 is sandwiched between upper and lower plates 458a, 458b. Located between plate 454 and upper plate 458a are a series of ball bearings or rollers 456a, and between plate 454 and lower plate 458b are an additional series of ball bearings or rollers 456b. Plate 454 is deformed under pressure from ball bearings 456a, 456b acting on the top and bottom surfaces 459, 460 of plate 454. Ball bearings 456a, 456b are spaced to produce a wave along the circumference of the circular plate 454.

In operation, upper and lower plates 458a, 458b are stationary and plate 454 is rotated. Rotation of plate 454 causes ball bearings 456a, 456b to rotate at half the speed of plate 454. As plate 454 is rotated, the wave travels around the circumference of the plate. As a result, each segment of piezoelectric disk 452 experiences cyclic loads, resulting in a voltage generated by the piezoelectric. This signal is rectified to extract electrical energy from the system. Since the plate deformation corresponds to a wave with constant amplitude, the total mechanical energy in the system remains substantially unchanged. Instead, the locations with maximum mechanical energy rotate around the disk. This system is similar to the system of FIG. 17a; however, instead of several discrete transducer elements that operate with different phases, a continuous transducer element with segmented electrodes is used. As a result, the mechanical energy is reused. The mechanical energy present in deforming each transducer segment is transferred to the next transducer segment as the wave travels around disk 452. As a result, all the energy being put into the system to rotate plate 454 is converted to electrically energy (minus the frictional losses or other dissipative effects). As a result, the effective coupling coefficient for the device is very high (close to 1).

Figure 23A:
FIGS. 23a and 23b are perspective views of another alternative embodiment of a generator mechanism, with only one transducer element being shown in FIG. 23a for clarity.
Figure 23B:
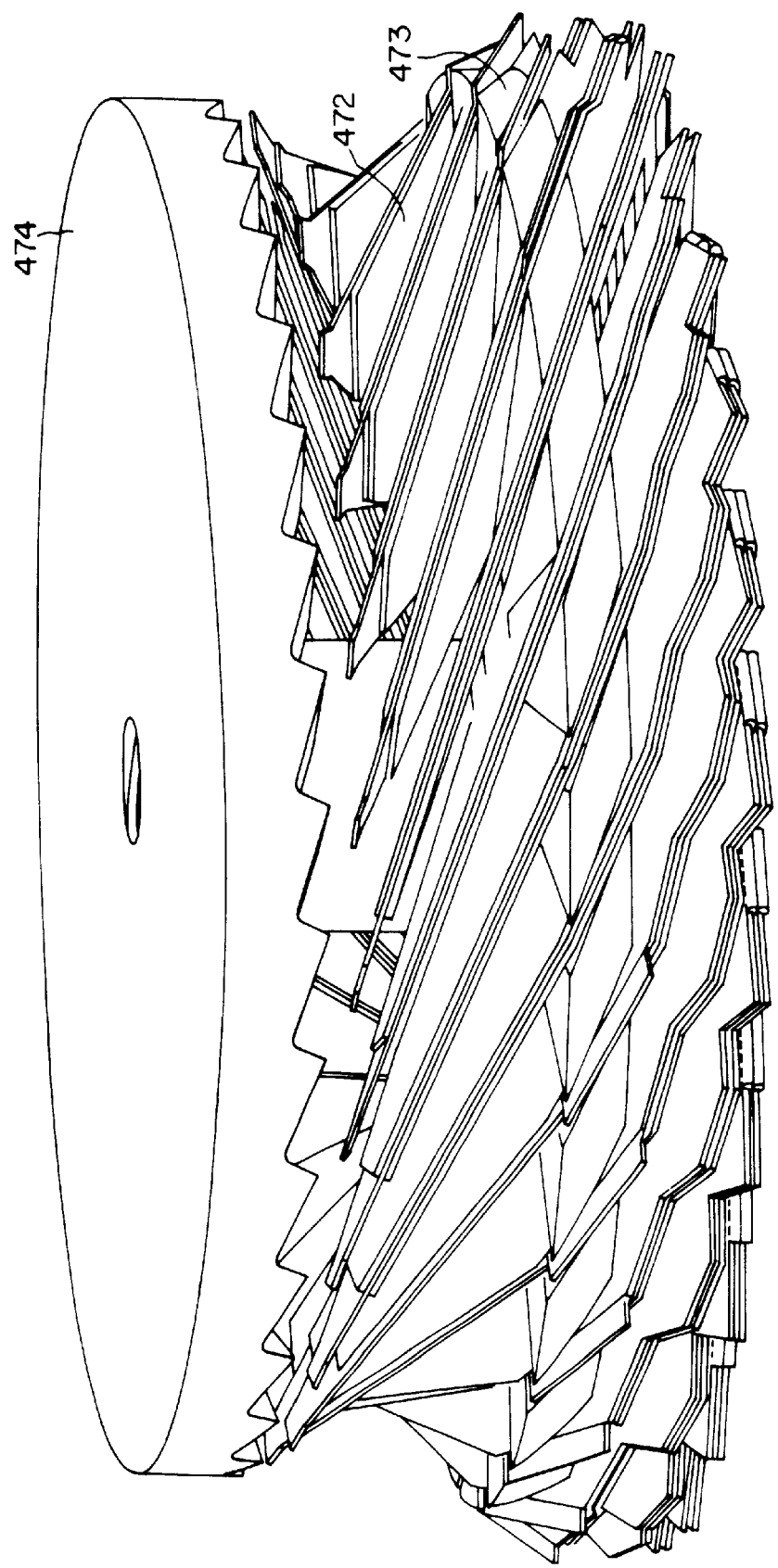

In another embodiment, the energy stored in the form of mechanical energy in the transducer element is harvested by taking advantage of free vibrations of the element. Referring to FIGS. 23a and 23b, a generator includes cantilevered bimorph transducer elements 472 mounted to a stationary member 473, and a rotatable disk 474 for inducing a deflection at the tip 476 of each transducer element 472. Disk 474 includes teeth 478 for deflecting transducer elements 472. When a transducer element 472 clears the tip 480 of a tooth 478, transducer element 472 is free to vibrate. As each transducer element 472 goes through multiple cycles during free vibration, an electronic circuit, such as described in U.S. Ser. No. 09/584,881, supra, coupled to the transducer element extracts electric power.

During the initial swing, as transducer element 472 reaches the peak of its deformation, a fraction of the energy is stored as electrical energy and the remainder is stored as mechanical energy. The electrical energy is harvested by the electric circuit connected to the transducer element. As transducer element 472 swings back towards it equilibrium position, the mechanical energy is converted to kinetic energy. As transducer element 472 continues to swing to the peak deformation in the opposite side, again a fraction of the energy is stored in electrical energy and the remainder is stored as mechanical energy.

Thus, during each cycle of the vibration, a portion of the transducer element's total energy can be harvested. The remainder of the energy is redistributed to electrical and mechanical energy in the next cycle. Since there are multiple opportunities to extract the energy from the transducer element, a larger portion of the total energy can be extracted, resulting in higher effective coupling coefficient, and higher efficiency than could be achieved by static loading of the transducer elements.

Figure 29:
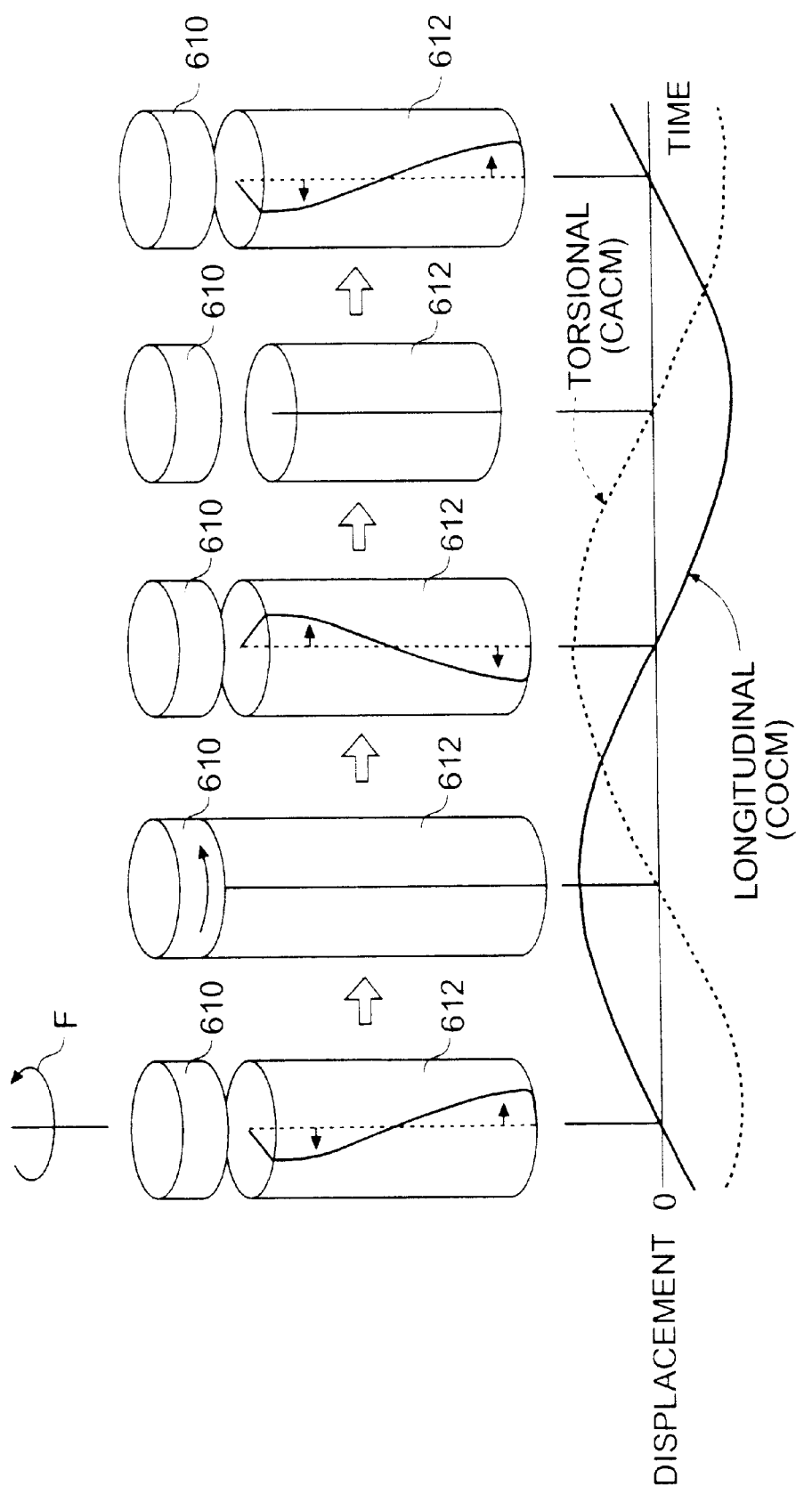
FIG. 29 shows a representation of an active element in sequential stages of longitudinal and rotational deflection.

Referring to FIG. 29, a controlled interface generator includes a rotary or translating body 610, which is acted on by an external force or torque, F, and exhibits rotation or translation resulting from this external force or torque. One or more active elements 612 intermittently make contact at single or multiple contact points with body 610. Alternately, the active element can be acted on directly by the external force or torque and exhibit rotation or translation and the body can be fixed.

The active element 612 has two primary functions or behaviors. First, element 612 is configured to make controllable intermittent contact with body 610 at one or more contact points. This controllable motion into or out of contact with body 610 is the contact component of motion (COCM). The contact component of motion (COCM) enables active element 612 to make contact with body 610, and is typically loosely aligned with normal to body 610 at the contact point(s). The second, called the Carry component of motion (CACM), enables active element 612 to translate with a motion parallel to the motion of body 610 at the contact point(s) due to the motion of body 610. Thus, active element 612 has two components of motion at the contact point(s).

When contact is made between active element 612 and body 610, there is a frictional or mechanical coupling between the active element and the body such that forces exist between the active element and the body causing the active element to move in the CACM direction, i.e., parallel to the motion of the body at the contact point.

The contact component of motion (COCM) of the active element can be controlled by a contact control mechanism, for example, electromagnetics, pneumatics, hydraulics, thermal actuation, or active materials such as magnetostrictive, piezoelectric, electrostrictive, etc. The contact control mechanism allows controllable intermittent contact between active element 612 and body 610. This can be achieved through quasi-static motion or dynamic motion of the contact point. As an example of a dynamic motion, a piezoelectric element can be coupled to a vibration mode of the active element, which has motion at the contact point(s) in the COCM direction. If the piezoelectric element is excited at a frequency at or near the natural resonance frequency of that mode, the resonance of the active element will cause relatively large amplitude motion in the COCM direction. If the vibrating active element is positioned in proximity to the body 610, intermittent contact will occur during some portion of the vibration cycle. The vibrating active element can also be pushed against the body by a soft support and intermittent contact will also occur since the soft support cannot maintain contact between the active element and the body at the contact points during all portions of the vibration cycle. As an example of quasi-static contact control means, the contact point on the active element can be moved into contact with the body through control signals, (voltage drive or a piezoelectric stack, or bimorph) at frequencies below the first mode of the active element which has motion components in the COCM direction of the contract points.

Electrical energy is generated from mechanical motion and forces in the CACM direction transmitted between active element 612 and body 610 during contact. A piezoelectric or piezomagnetic element (magnetostrictive, electrostrictive magnetic shape memory alloy etc) is coupled to (and configures in) the active element such that CACM direction forces and motion are coupled to the voltage and current or charge (collectively the electrical states of the system) at a set of generating element electrodes or electrical terminals. These electrodes are in turn connected to electronics for extraction of electrical power from the mechanical disturbances represented by the intermittent forcing of the active element by the above mentioned contact forces. The electronics can be a passive diode arrangement (passive energy harvesting) such as a full bridge or more complex electronics involving switches under active control (active energy harvesting), as discussed in U.S. Ser. No. 09/584, 881, supra.

As a result of the above mentioned electromechanical coupling, the controlled intermittent contact (potentially periodic) to body 610 produces an intermittent (periodic) deformation of active element 612 and resulting oscillation of the voltage or current signal present at the generating element electrodes. This allows for electrical energy extraction from the active or passive extraction circuitry.

The CACM direction motion of the active element at the contact point can be dynamic or quasi-static depending on the implementation. As an example of a dynamic implementation, consider a coupling between the generating element and a mode of the active element that has large motion at the contact points in the CACM direction. Then periodic mechanical excitation of this mode by the controlled periodic (intermittent) contact forces in the CACM direction can result in forced excitation of the dynamic (resonant) modal oscillation of the active element and through its coupling, the generating element. Oscillatory forcing of the generating element and connected extraction electronics then enable electrical power extraction.

In the case that the CACM (coupled to the generator element) and the COCM (coupled to and controlled by the contact control means) both involve resonant modes of the active element it is 1) desirable to have these modes close to each other such that the contact forcing frequency will excite both the CACM mode and the COCM mode and 2) it is desirable to pick the contact forcing frequency such that the CACM and COCM are near 90 degrees out of phase (i.e., CACM is zero when COCM is max or min, etc). This is achieved by designing the active element such that the two modes are separated in natural frequency but close enough in frequency such that the phase transitions between the driving phase and the response signal phase for the given modes overlap. This allows for a driving frequency picked between the two modes (not coincident with either modal frequency exactly) to excite both modes with a net phase difference near 90 degrees. This will allow for an elliptical trajectory of the active element motion at the contact point derived from the CACM and COCM motion being out of phase. Contact is made over only a portion of the elliptical trajectory (when the COCM is largest and contact is made) and recovery of the active element occurs over the rest (than the COCM moves out of contact with the rotor/slider).

As a specific example of a resonant system consider the longitudinal/torsional configuration described in "Piezoelectric Ultrasonic Motor using Longitudinal-Torsional Composite Resonance Vibration" Ohnishi, Myohga, Uchikawa, Tamegai, and Inoue, *IEEE Transactions on Ultrasonics Ferroelectrics and Frequency Control*, Vol 40, No 6, November 1993, hereby incorporated by reference herein in its entirety. FIG. 1 is a motor but if the Piezoelectric element labeled (L) excited the COCM and the Piezoelectric element labeled (T) acts as the generator element and is electrically connected to extraction electronics, then external forcing of the rotor and high frequency forcing of the COCM by Piezo(L) at the appropriate frequency will result in extracted power.

A quasi-static version of the system can use, for example, a burleigh inchworm motor with an expander as the generator element.

What is claimed is:

1. A method of extracting electrical energy from mechanical motion, comprising:

providing at least two transducers that act to convert mechanical motion to electrical energy;

coupling the at least two transducers to a plate defining a waved surface;

providing relative rotation between the plate and the transducers such that the waved surface causes the transducers to mechanically bend out-of-phase relative to each other; and connecting a rectifying circuit to the transducers to extract electrical energy from the transducers.

2. An apparatus for extracting electrical energy from mechanical motion, comprising:

a plate defining a waved surface;

at least two transducers that act to convert mechanical motion to electrical energy coupled to the plate such that relative rotation between the plate and the transducers causes the transducers to mechanically bend out-of-phase relative to each other; and a rectifying circuit connected to the transducers to extract electrical energy from the transducers.

3. The apparatus of claim 2, wherein the waved surface is sinusoidal.

4. The method of claim 1, wherein the out-of-phase mechanical bending of the transducers results in an elastic portion of mechanical energy in one transducer being transferred to the other transducer through the plate.

5. The method of claim 1, wherein providing relative rotation comprises rotating the plate relative to the transducers.

6. The apparatus of claim 1, wherein the out-of-phase mechanical bending of the transducers comprises one transducer bending 90 degrees out-of-phase relative to the bending of the other transducer.

7. The apparatus of claim 2, wherein the out-of-phase mechanical bending of the transducers results in an elastic portion of mechanical energy in one transducer being transferred to the other transducer through the plate.

8. The apparatus of claim 2, wherein the relative rotation between the plate and the transducers comprises rotation of the plate relative to the transducers.

9. The apparatus of claim 2, wherein the out-of-phase mechanical bending of the transducers comprises one transducer bending 90 degrees out-of-phase relative to the bending of the other transducer.

10. An apparatus for extracting electrical energy from mechanical motion, comprising:

an upper plate;

a lower plate;

a middle plate sandwiched between the upper plate and the lower plate including a segmented transducer disk that acts to convert mechanical motion to electrical energy;

bearings located between the upper plate and the middle plate, and between the lower plate and the middle plate and acting on the middle plate such that relative rotation of the middle plate and the upper and lower plates produces a mechanical deformation of the middle plate corresponding to a wave with constant amplitude that travels along the segmented transducer disk; and a rectifying circuit connected to the segmented transducer disk to extract electrical energy from the segmented transducer disk.

11. The apparatus of claim 10, wherein the mechanical deformation of the segmented transducer disk results in an elastic portion of mechanical energy in one segment of the segmented transducer disk being transferred to another segment of the segmented transducer disk.

12. The apparatus of claim 10, wherein the relative rotation comprises rotation of the middle plate relative to the upper and lower plates.

* * * * *